(12) United States Patent
Sprague et al.

(10) Patent No.: US 11,442,332 B1
(45) Date of Patent: Sep. 13, 2022

(54) TUNABLE LIQUID CRYSTAL LENS WITH ELECTRICALLY TUNABLE AXIS OF ASTIGMATISM

(71) Applicant: Amazon Technologies, inc., Seattle, WA (US)

(72) Inventors: Robert Arthur Sprague, Saratoga, CA (US); Jim Weijian Li, Fremont, CA (US); Haiwei Chen, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/080,304

(22) Filed: Oct. 26, 2020

(51) Int. Cl.
G02F 1/29 (2006.01)
G02C 7/08 (2006.01)

(52) U.S. Cl.
CPC ............... *G02F 1/29* (2013.01); *G02C 7/083* (2013.01); *G02F 2201/121* (2013.01); *G02F 2201/122* (2013.01)

(58) Field of Classification Search
None
See application file for complete search history.

(56) References Cited

U.S. PATENT DOCUMENTS

| | | | | |
|---|---|---|---|---|
| 2001/0040743 A1* | 11/2001 | Graves | .................... | G02B 26/06 359/849 |
| 2007/0183293 A1* | 8/2007 | Murata | ................. | G11B 7/1369 369/112.02 |
| 2009/0201785 A1* | 8/2009 | Shinoda | ................ | G11B 7/1378 |
| 2013/0037202 A1* | 2/2013 | Ando | ..................... | G02F 1/1341 156/99 |
| 2013/0342887 A1* | 12/2013 | Leister | ................ | G02F 1/13342 359/254 |
| 2014/0139768 A1* | 5/2014 | Galstian | .................... | G02F 1/29 349/33 |
| 2015/0029424 A1* | 1/2015 | Gordon | ............ | G02F 1/133305 349/13 |
| 2015/0138498 A1* | 5/2015 | Lin | .................... | G02F 1/134309 349/200 |
| 2016/0011564 A1* | 1/2016 | Tanabe | ................ | G02F 1/13471 359/11 |
| 2016/0178811 A1* | 6/2016 | Choi | ........................ | G02B 3/14 349/139 |
| 2017/0293197 A1* | 10/2017 | Van Heugten | ............ | G02F 1/29 |
| 2018/0052377 A1* | 2/2018 | Gordon | ............... | G02F 1/13439 |
| 2018/0246354 A1* | 8/2018 | Popovich | .............. | G02F 1/1334 |
| 2018/0292678 A1* | 10/2018 | Yadin | ........................ | G02F 1/29 |
| 2019/0346718 A1* | 11/2019 | Liu | ................... | G02F 1/134309 |
| 2020/0166820 A1* | 5/2020 | Wurmfeld | .................. | G02F 1/29 |
| 2020/0301239 A1* | 9/2020 | Akkaya | .............. | G02B 27/0081 |
| 2021/0186680 A1* | 6/2021 | Ma | ............................ | G02F 1/23 |
| 2021/0199992 A1* | 7/2021 | Rosen | ............... | G02F 1/134309 |

* cited by examiner

*Primary Examiner* — Ryan Crockett
(74) *Attorney, Agent, or Firm* — Kilpatrick Townsend & Stockton LLP

(57) ABSTRACT

An optical system includes a first set of electrodes arranged in a concentric pattern and a liquid crystal material in electrical communication with the first set of electrodes. The optical system also includes a second set of electrodes arranged in a two-dimensional pattern and in electrical communication with the liquid crystal material.

20 Claims, 18 Drawing Sheets

TUNABLE LIQUID CRYSTAL LENS WITH ELECTRICALLY TUNABLE AXIS OF ASTIGMATISM

BACKGROUND

Liquid crystal materials have been used to provide an optical material that can provide dynamic matching between the index of refraction of the liquid crystal materials and the materials surrounding the liquid crystal materials. In a specific application, liquid crystal lenses can be fabricated using a layer of liquid crystal material sandwiched between two transparent substrates. Electrodes are integrated into the structure to provide control signals used to modulate the phase of light propagating through the liquid crystal lens.

BRIEF DESCRIPTION OF THE DRAWINGS

Various embodiments in accordance with the present disclosure will be described with reference to the drawings, in which.

DETAILED DESCRIPTION

Figure 1:
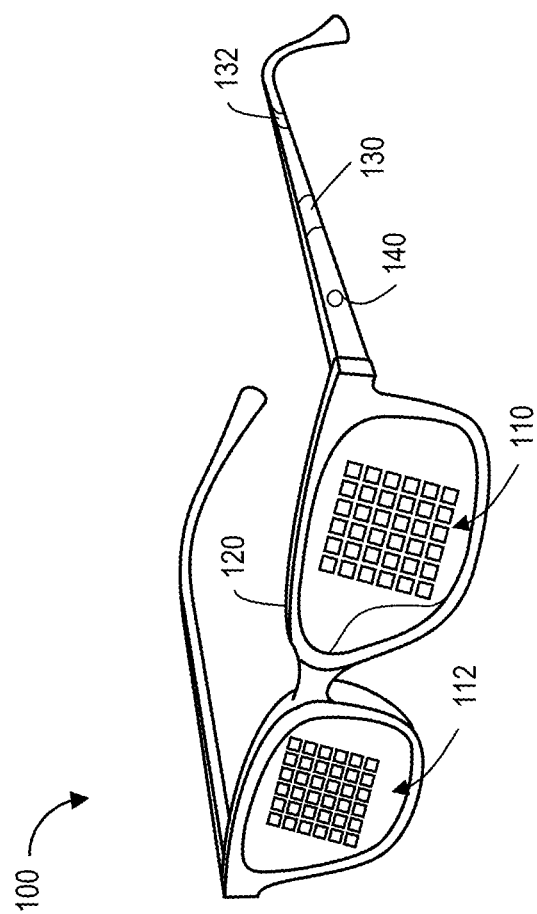
FIG. 1 illustrates a schematic diagram of an optical system incorporating an astigmatic liquid crystal Fresnel lens according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optical systems including a tunable liquid crystal lens that is suitable for use in ophthalmic, augmented reality, and other applications. The tunable liquid crystal lens is tunable in the sense that the focal length of the lens can be electrically controlled to provide tunable optical power, astigmatism, and rotation of the astigmatic axis.

In an example, a liquid crystal lens includes transparent electrodes on the input and output faces of a structure including a liquid crystal material and a housing. As an example, indium tin oxide (ITO) can be utilized to form the transparent electrodes. When a voltage is placed across the transparent electrodes, the index of refraction of the liquid crystal material disposed between the transparent electrodes changes in response to the application of the voltage. In a first state, i.e., a zero-power state, no voltage is placed across the transparent electrodes and the index of refraction of the liquid crystal lens material is matched to the index of refraction of the housing. As a result of the matching index of refraction of the liquid crystal lens material and the housing, the "lens" has no optical power, which is equivalent to a focal length of the lens of R=∞. In a second state, i.e., a finite optical power state, a non-zero voltage is placed across the transparent electrodes and the index of refraction of the liquid crystal lens material changes to a value different from the index of refraction of the housing. As a result of the difference in the index of refraction of liquid crystal lens material and the housing, the "lens" has a finite optical power, which is equivalent to a focal length of the lens of $R=R_1$. By varying the voltage that is placed across the transparent electrodes over a range of voltage levels, the optical power can be varied to produce a range of focal lengths from $R_1 < R < \infty$.

In order to introduce astigmatism in the liquid crystal lens in addition to spherical optical power, embodiments of the present disclosure utilize a two-dimensional distribution of electrodes, for example, a two-dimensional matrix of electrodes or a set of segmented electrodes, to introduce a controllable voltage that varies as a function of lateral position. Using these distributed electrodes, which can be considered as a set of controllable, transparent pixels, distributed in two-dimensions, astigmatism can be introduced by addressing the distributed electrodes using a voltage pattern that varies, for example, with a low voltage at opposing edges of the set of distributed electrodes and a higher voltage at the center of the set of distributed electrodes. In this case, the variation in voltage as a function of lateral position, for example, along an x-axis, results in an index of refraction variation that is lower at the opposing edges of the liquid crystal lens and highest in the center of the liquid crystal lens, resulting in a cylindrical lens. By selecting a voltage level for each distributed electrode that results in an index of refraction that is different from the index of refraction of the housing and varies in both lateral directions, an astigmatic lens is provided that is characterized by radii of curvature in one or both lateral directions (i.e., Rx and Ry) and an astigmatic axis oriented a predetermined angle (θ).

Accordingly, the tunable, astigmatic liquid crystal Fresnel lens described herein provides an optical power (i.e., spherical optical power) proportional to a uniform or radially varying voltage, cylindrical optical power proportional to a variation in voltage as a function of lateral position (i.e., along the x-axis and the y-axis), as well as a predetermined orientation or tilt of the axes of the cylinder.

Several different kinds of distributed electrodes are described herein, including a two-dimensional array of pixelated electrodes, all having the same size in one embodiment, and a set of segmented electrodes that includes a plurality of adjoining segments distributed across the lateral surface of the liquid crystal Fresnel lens. Additionally, several different kinds of electrode structures suitable for introducing spherical optical power are described herein, including Fresnel lens structures with concentric electrodes and resistive bridge electrodes. In the case of either the concentric electrodes or the resistive bridge electrodes, a patterned relief structure can be replaced with a flat layer of concentric electrodes or electrodes having resistive bridges positioned between them to control the voltage in a spherically symmetric pattern and thereby produce spherical power.

FIG. 1 illustrates a schematic diagram of an optical system incorporating a set of astigmatic liquid crystal Fresnel lenses according to an embodiment of the present disclosure. The optical system 100 includes tunable astigmatic lenses 110 and 112, a frame 120 supporting the lens, and a power source 130. In the example, illustrated in FIG. 1, the frame 120 is implemented as a pair of glasses, for example, reading glasses. The user, by actuating switch 140, can connect the tunable astigmatic lenses 110 and 112 to the power source 130 and controller 132, switching the tunable astigmatic lenses 110 and 112 from a non-powered mode in which the tunable astigmatic lenses 110 and 112 are characterized by no optical power to a powered mode in which the tunable astigmatic lenses 110 and 112 are characterized by a predetermined optical power and a predetermined astigmatism oriented at a predetermined axis of rotation. Thus, the user is provided with reading glasses that not only provide spherical optical power, but astigmatism correction appropriate for the user. In some embodiments, the tunable astigmatic lenses 110 and 112 are operated to have a different optical power and astigmatism to provide different astigmatic correction for each eye of the user.

The tunable astigmatic lenses 110 and 112 can be implemented using any of the lens structures described herein, including the lens structures illustrated in FIG. 3A, 3C, 4, 8, or 9. In some embodiments, an eye tracking system is utilized to determine that the user's eyes have shifted from focusing on a distant object to a close object. In response, the optical properties of the tunable astigmatic lenses 110 and 112 can be modified from a first setting, for example, a prescription for distance viewing, to a second setting, for example, a prescription for reading. Accordingly, glasses that are suitable for implementing different prescriptions, including astigmatism corrections, are provided by embodiments of the present disclosure. Thus, using embodiments of the present disclosure, tunable glasses with controllable prescriptions including spherical optical power and astigmatism are provided by embodiments of the present disclosure.

Figure 2A:
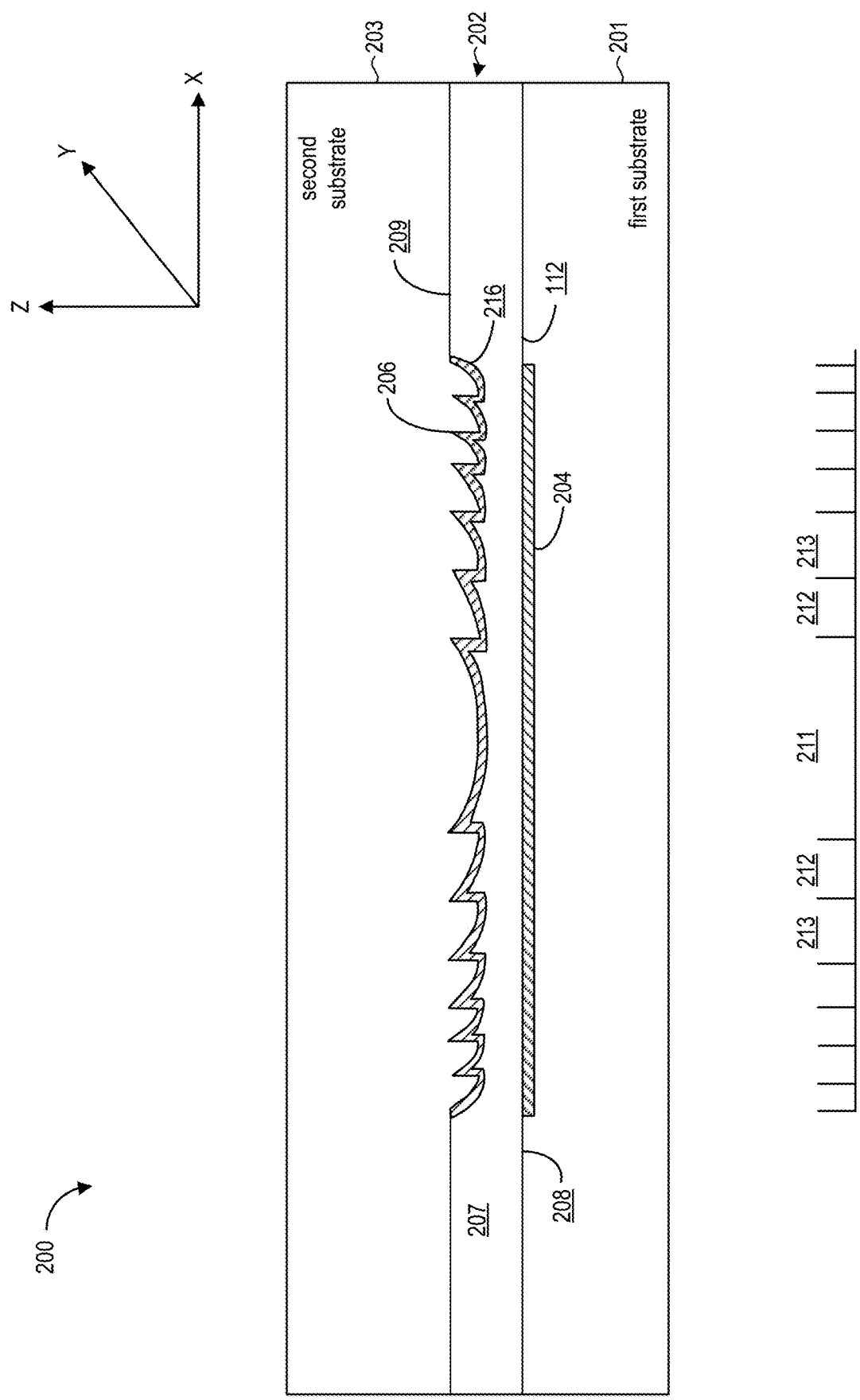
FIG. 2A illustrates a cross section view of a liquid crystal Fresnel lens.

FIG. 2A illustrates a cross section view of a liquid crystal Fresnel lens. The liquid crystal Fresnel lens 200 illustrated in FIG. 2A utilizes a reduced amount of material in comparison with a conventional lens by dividing the refractive surfaces of the Fresnel lens into a set of concentric annular sections. In each section of the liquid crystal Fresnel lens, similar to a conventional Fresnel lens, the curvature of the corresponding original lens surface is maintained, but with stepwise discontinuities between each section. The stepwise discontinuities are designed to introduce an integer number of wavelengths of phase shift at each discontinuity, also referred to as phase wrapping, thereby imitating a continuous refractive surface. In comparison with conventional lenses, the use of a Fresnel lens enables a reduction in lens thickness. Additionally, according to embodiments of the present disclosure, the liquid crystal Fresnel lens enables a tunable focal length as a result of the variable index of refraction of the Fresnel lens structure 202. By applying a variable voltage across the Fresnel lens structure 202, the index of refraction of the Fresnel lens structure 202 can be varied, resulting in a variable and tunable focal length lens.

As illustrated in FIG. 2A, the liquid crystal Fresnel lens 200 includes a first substrate 201, a Fresnel lens structure 202, and a second substrate 203. In order to provide a high level of optical quality and operate as a lens, the first substrate 201 and the second substrate 203 are designed and fabricated to provide a high level of optical transmission, i.e., the first substrate 201 and the second substrate 203 are optically transparent. The first substrate 201 and the second substrate 203 are generally planar, although, as described more fully below, one or more surfaces of the first substrate 201 and/or the second substrate 203 may have non-planar features. The first substrate 201 and the second substrate 203 can be fabricated using a variety of materials that provide mechanical rigidity to support the Fresnel lens structure 202, electrodes, and the like. As an example, the first substrate 201 and the second substrate 203 can be fabricated using polymers characterized by light weight and high transparency, glass, and combinations thereof. One or more optical coatings, for example, anti-reflection coatings, scratch resistant coatings, and the like, can be deposited or otherwise adhered to the first substrate 201 and/or the second substrate 203 during manufacturing or once the liquid crystal Fresnel lens 200 has been assembled with the Fresnel lens structure 202 sandwiched between the first substrate 201 and the second substrate 203.

Referring to FIG. 2A, the liquid crystal Fresnel lens 200 includes the Fresnel lens structure 202 positioned between the first substrate 201 and the second substrate 203. The Fresnel lens structure 202 includes a thin layer of a liquid crystal material 207 that has varying thickness as measured normal to the lateral plane (i.e., the x-y plane). The liquid crystal material 207 is in electrical communication with drive electrode 204 and common electrode 206. A variety of liquid crystal materials can be utilized according to embodiments of the present disclosure, including nematic liquid crystals, smectic liquid crystals, cholesteric phase forming liquid crystals or the like. Additionally, liquid crystals including polymers can also be utilized, for example, polymer liquid crystals, polymer dispersed liquid crystals, or liquid crystals stabilized by polymers.

In the cross section view illustrated in FIG. 2A, variation in layer thickness as measured normal to the x-axis is illustrated, although it will be appreciated that variation in layer thickness is also present along the y-axis, which extends into the plane of the figure in FIG. 2A. The Fresnel lens structure 202 is characterized by a substantially planar surface 208 and a patterned surface 216. The patterned surface 216 includes the set of concentric annular sections having a curvature corresponding to the predetermined lens surface separated by the stepwise discontinuities between each section discussed above in relation to the structure and operation of a Fresnel lens. Referring to FIG. 2A, regions 211, 212, and 213 are illustrated. Region 211 corresponds to a central circular region of the Fresnel lens structure 202. In addition this this central circular region, two annular regions, region 212 and 213 are also illustrated as surrounding region 211. The cross section view in FIG. 2A shows that region 212 surrounds region 211 and is, in turn, surrounded by region 213.

In order to fabricate the elements making up liquid crystal Fresnel lens 200, the surfaces of the first substrate 201 and the second substrate 203 can be cast or molded using tooling dies fabricated using diamond-turning techniques, replicated from diamond-turned masters, printed using additive manufacturing processes, also referred to as three-dimensional printing, or the like.

In order to establish an electric field across the liquid crystal material 207 present in the Fresnel lens structure 202, a set of transparent electrodes is utilized. As illustrated in FIG. 2A, a drive electrode 204 is disposed on one surface of the Fresnel lens structure 202 (i.e., the substantially planar surface 208 facing the first substrate 201) and a common electrode 206 is disposed on the patterned surface 216 of the Fresnel lens structure 202.

The drive electrode 204 and the common electrode 206 can be deposited on the surface 218 of the first substrate 201 and the surface 209 of the second substrate 203, respectively. Depending on the geometry and dimensions of the drive electrode 204 and the common electrode 206, suitable deposition methods can be utilized, including screen printing, photolithographic processes, or the like. In order to maintain high levels of transparency for the liquid crystal Fresnel lens 200, the drive electrode 204 and the common electrode 206 are fabricated using substantially transparent, electrically conductive materials. For example, the drive electrode 204 and the common electrode 206 can be fabricated using one or more of a variety of transparent conductive oxides including indium tin oxide, fluorine doped tin oxide, indium oxide, doped zinc oxide, or the like. The thickness of the drive electrode 204 and the common electrode 206 can be selected depending on the particular application, and generally have thicknesses in the range of several hundred Angstroms, for example, 1,000 Å.

In some embodiments, the liquid crystal Fresnel lens is designed such that if no voltage is applied across the liquid crystal material, then the index of refraction of the liquid crystal material matches the index of refraction of the first substrate 201 and the second substrate 203, which in this embodiment, form the housing of the liquid crystal Fresnel lens. In this case, the liquid crystal Fresnel lens has no optical power and does not focus or defocus incident light. As will be evident to one of skill in the art, the liquid crystal Fresnel lens could be designed such that the index of refraction of the liquid crystal material, in the absence of an applied voltage, does not match the index of refraction of the first substrate 201 and the second substrate 203, thereby resulting in a liquid crystal Fresnel lens that has a predetermined focal length in the absence of an applied voltage. One of ordinary skill in the art would recognize many variations, modifications, and alternatives.

As discussed above, the Fresnel lens structure 202 is characterized by a substantially planar surface 208 on the surface of the Fresnel lens structure 202 facing the surface 218 of the first substrate 201. By applying a voltage between the drive electrode 204 and the common electrode 206, the index of refraction of the liquid crystal material of the Fresnel lens structure 202 can be varied. By varying the index of refraction with respect to the index of refraction of substrate 201 and substrate 203, a lensing effect can be implemented, resulting in a predetermined focal length for liquid crystal Fresnel lens 200.

Figure 2C:
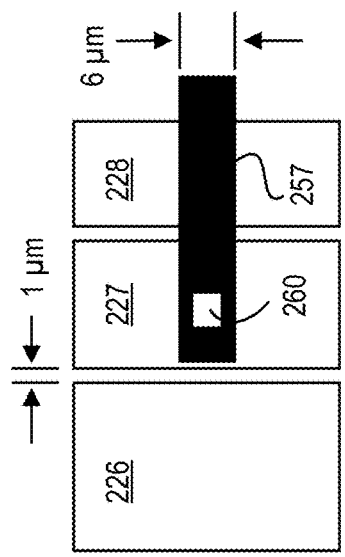
FIG. 2C illustrates a plan view of concentric electrodes illustrated in FIG. 2B, a bus line, and a via providing electrical connectivity between one of the concentric electrodes and the bus line.
Figure 2B:
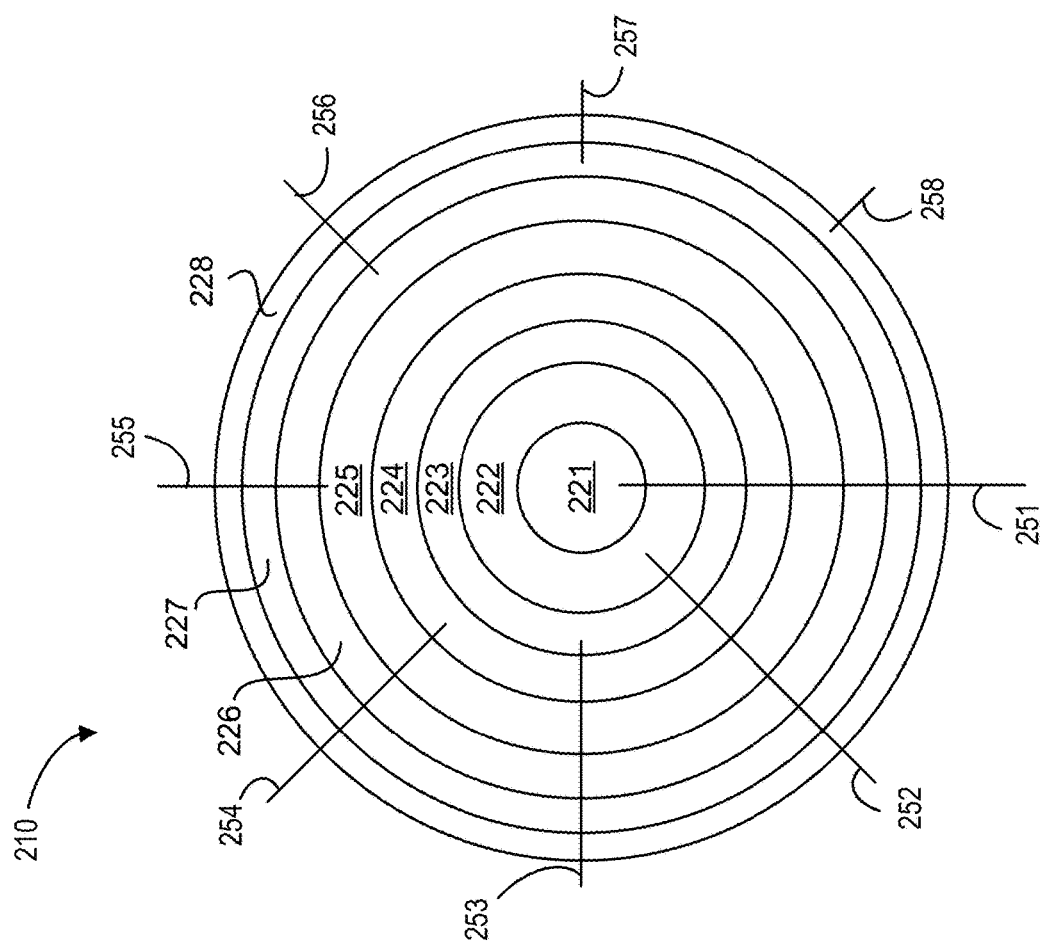
FIG. 2B illustrates a plan view of concentric electrodes for a liquid crystal Fresnel lens.

FIG. 2B illustrates a plan view of concentric electrodes for a liquid crystal Fresnel lens. Referring to FIG. 2B, the concentric electrodes 210 include a center electrode 221 and a set of seven annular electrodes 222, 223, 224, 225, 226, 227, and 228. It should be noted that the concentric electrodes 210 typically include additional annular electrodes disposed peripherally to the annular electrode 228 that are not illustrated for purposes of clarity. Thus, it will be appreciated that embodiments of the present disclosure are not limited to the precise number of concentric electrodes illustrated in FIG. 2B and other numbers of concentric electrodes in addition to or less than the one center electrode and seven annular electrodes illustrated in FIG. 2B are included within the scope of the present disclosure.

In order to fabricate concentric electrodes 210, photolithography or other suitable printing techniques can be used to deposit the center electrode 221 and the set of seven illustrated annular electrodes 222, 223, 224, 225, 226, 227, and 228 as well as the additional annular electrodes disposed peripherally to the annular electrode 228. Referring to FIGS. 2A and 2B, the center electrode 221 is aligned with region 211 and the two innermost annular electrodes 222 and 223 are aligned with regions 212 and 213, respectively. Thus, in the x-y plane, the center electrode 221 is aligned with the center of the Fresnel lens structure 202, the annular electrode 222 is aligned with the first concentric annular section surrounding the center of the Fresnel lens structure 202 as defined by the patterned surface 216 of the Fresnel lens structure 202, and the annular electrode 223 is aligned with the second concentric annular section surrounding the first concentric annular section as defined by the patterned surface 216 of the Fresnel lens structure 202. Similarly, the annular electrodes 223, 224, 225, 226, 227, and 228, with continuously increasing diameters, are aligned with the corresponding concentric annular sections having continuously increasing diameters. Depending on the application, the width of each of the regions 211, 212, 213, etc., will be selected as a function of the optical power desired, the overall lens diameter, and the like. Typically, the widths of the regions 211, 212, 213, etc. are on the order of tens of microns to hundreds of microns or millimeters. One of ordinary skill in the art would recognize many variations, modifications, and alternatives.

By applying a voltage between each of the concentric electrodes 221-228 and the common electrode 206, the index of refraction of the liquid crystal material of the Fresnel lens structure can be varied as a function of lateral position. By varying the index of refraction of the liquid crystal material, the focal length of the Fresnel lens can be varied, for example, increased from a focal length of infinity corresponding to an applied voltage of 0 V, to a positive or negative focal length corresponding to a finite applied voltage, depending on the shape of the surface relief pattern.

As an example, by varying the index of refraction in a radial manner, with a higher index of refraction in the central portion of the Fresnel lens structure and a lower index of refraction in the peripheral portion of the Fresnel lens structure (i.e., resulting from higher voltages applied to centrally located concentric electrodes than applied to more peripherally located concentric electrodes), the lensing effect can result in a predetermined focal length for the liquid crystal Fresnel lens. In this example, with a higher index of refraction in the central portion of the Fresnel lens structure, a positive lens is formed that is characterized by a predetermined focal length. Phase wrapping can be implemented at the intersection between adjacent concentric electrodes to provide suitable optical power.

In another example, the voltage between the concentric electrodes and the common electrode 206 can be lower at the center than at the periphery, resulting in a lower index of refraction in the central portion of the Fresnel lens structure and a higher index of refraction in the peripheral portion of the Fresnel lens structure, thereby producing a negative lens characterized by a predetermined negative focal length.

Thus, embodiments of the present disclosure utilize concentric and rotationally symmetric transparent electrodes, for example, fabricated using indium tin oxide, that are formed on a substrate. As an example, photolithographic techniques can be utilized to pattern the transparent electrodes on a glass substrate. In order to provide for electrical connectivity to the center electrode 221 and the set of seven illustrated annular electrodes 222, 223, 224, 225, 226, 227, and 228, a set of bus lines are electrically connected to each of the transparent electrodes. As illustrated in FIG. 2B, a bus line 251 provides electrical connection between drive electronics (not shown) and the center electrode 221. For the annular electrodes, a bus line 252 provides electrical connection to the annular electrode 222, a bus line 253 provides electrical connection to the annular electrode 223, a bus line 254 provides electrical connection to the annular electrode 224, a bus line 255 provides electrical connection to the annular electrode 225, a bus line 256 provides electrical connection to the annular electrode 226, a bus line 257 provides electrical connection to the annular electrode 227, and a bus line 258 provides electrical connection to the annular electrode 228.

Thus, in this embodiment of the present disclosure, each transparent electrode can be operated at an independent voltage with respect to the other transparent electrodes. In some embodiments, rather than providing separate and independent electrical connections to each transparent electrode, one or more transparent electrodes can be electrically connected to a single bus line. As an example, the annular electrodes 222, 223, and 224, because they have a larger annular width than the annular electrodes 225, 226, 227, and 228, could be connected to independent bus lines. However, because of their smaller annular width, the annular electrodes 225 and 226 could be connected to a single bus line and the annular electrodes 227 and 228 could be connected to another bus line. As a result, using only five bus lines, electrical connection can be provided to seven transparent electrodes. One of ordinary skill in the art would recognize many variations, modifications, and alternatives.

FIG. 2C illustrates a plan view of concentric electrodes illustrated in FIG. 2B, a bus line, and a via providing electrical connectivity between one of the concentric electrodes and the bus line. As discussed in relation to FIG. 2B, independent electrical connectivity can be provided to each of the transparent electrodes in some embodiments, whereas in other embodiments, multiple transparent electrodes could be electrically connected to a single bus line. The plan view shown in FIG. 2C illustrates a structure suitable for use in providing separate and independent electrical connections to the transparent electrodes.

Referring to FIG. 2C, the annular electrodes 226, 227, and 228 are illustrated. Bus line 257 is also shown in this plan view. A via 260 is provided in an electrically insulating layer (not shown in FIG. 2C, but illustrated in FIG. 2D) to provide for electrical contact between the annular electrode 227 and the bus line 257. Using this structure, a voltage applied to the bus line 257 can be present at the annular electrode 227 without making electrical contact with either the annular electrode 226 or the annular electrode 228. Thus, as illustrated in FIG. 2B, utilizing both concentric electrodes (i.e., transparent electrodes) and bus lines, which can also be referred to as linear electrodes, independent voltages can be established at each of the concentric electrodes. In some embodiments, the spacing between the center electrode and the first annular electrode and the annular electrodes and adjacent annular electrodes can be on the order of 1 μm, the width of the bus lines can be on the order of 6 μm, and the dimensions of the via can be on the order of 3 μm by 3 μm. In other embodiments, these specific values can be adjusted depending on the particular application.

Figure 2D:
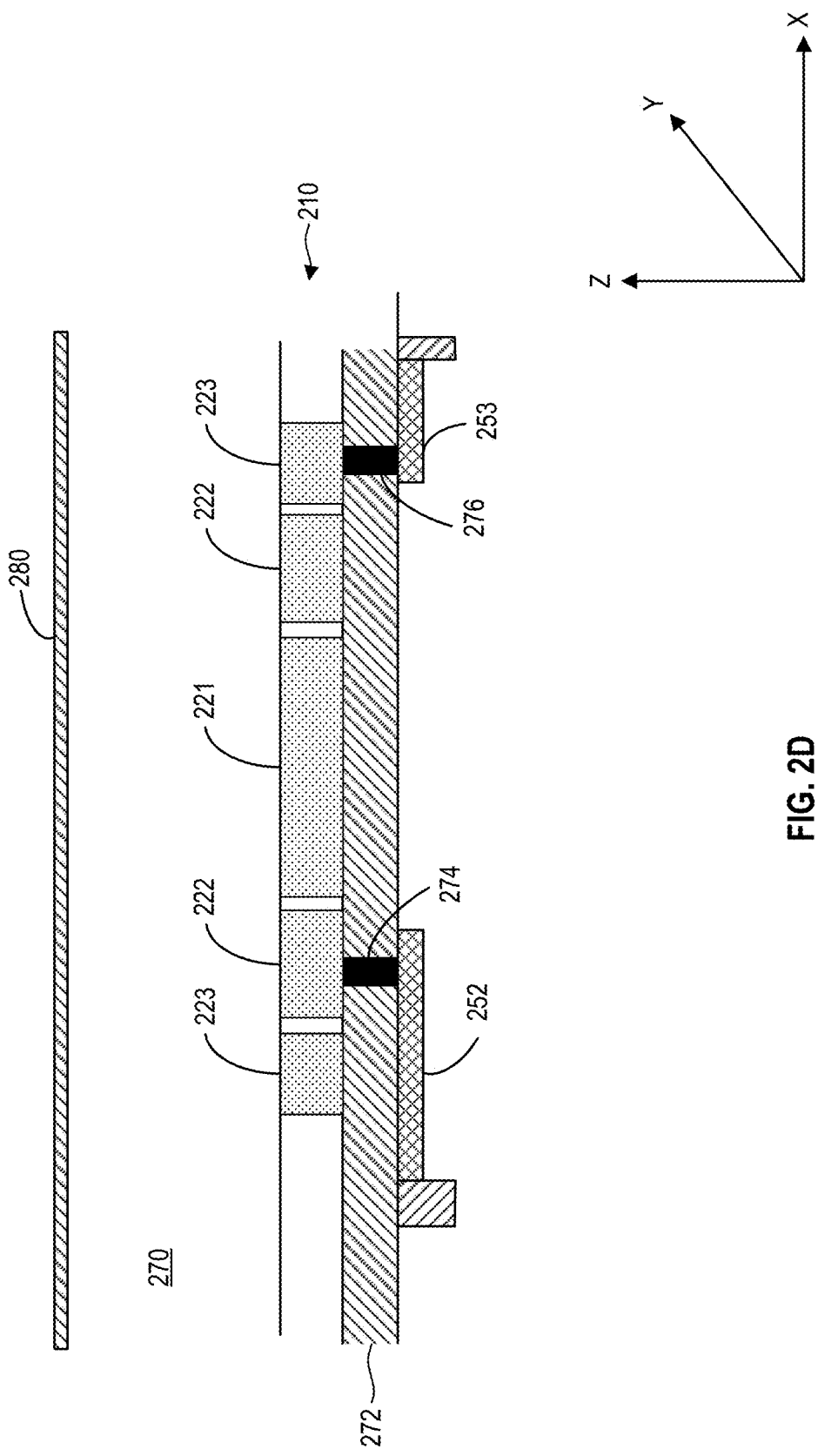
FIG. 2D illustrates a cross section view of a portion of the liquid crystal Fresnel lens illustrated in FIG. 2B.

FIG. 2D illustrates a cross section view of a portion of the liquid crystal Fresnel lens illustrated in FIG. 2B. For purposes of clarity, only the central portion of the liquid crystal Fresnel lens is illustrated, but it will be appreciated that the electrical and optical structures illustrated in FIG. 2D will be applicable to other portions of the liquid crystal Fresnel lens. Substrates supporting structures illustrated in FIG. 2D are not illustrated for purposes of clarity, but will contain the liquid crystal material and form a housing defined by a predetermined index of refraction.

Referring to FIG. 2D, a liquid crystal material 270 is sandwiched between a common electrode 280 and concentric electrodes 210. The liquid crystal material 270 is in electrical communication with common electrode 280 and concentric electrodes 210. In a manner similar to the liquid crystal Fresnel lens shown in FIG. 2A, a Fresnel lens is formed by varying the index of refraction as a function of lateral position, i.e., the x-y plane. Portions of concentric electrodes 210 are illustrated by the center electrode 221, which is surrounded by the annular electrode 222, which, in turn, is surrounded by the annular electrode 223. In this embodiment, the liquid crystal material 270 has a uniform thickness as a function of lateral position (i.e., the x-y plane). In other embodiments, as illustrated in FIG. 2A, the liquid crystal material 270 can have a variation in layer thickness in the lateral plane to form additional Fresnel sections as appropriate to the particular application. Thus, in this embodiment, the Fresnel lens structure is formed as a result of variation in index of refraction of the liquid crystal material 270 resulting from variation in the applied voltage as a function of lateral position (i.e., in this embodiment, radial position extending in the x-y plane).

As illustrated in FIG. 2D, an electrically insulating layer 272 is disposed between concentric electrodes 210 and the bus line 252 and the bus line 253. In order to provide for electrical connection between the bus line 252 and the annular electrode 222, a via 274 is formed passing through the electrically insulating layer 272 from the bus line 252 to the annular electrode 222. As a result, although the bus line 252 passes over the annular electrode 223, there is no electrical connection between the bus line 252 and the annular electrode 223. Similarly, the other annular electrodes illustrated in FIG. 2B that are peripheral to the annular electrode 222 are electrically isolated from the bus line 252 by the presence of the electrically insulating layer 272.

Figure 4A:
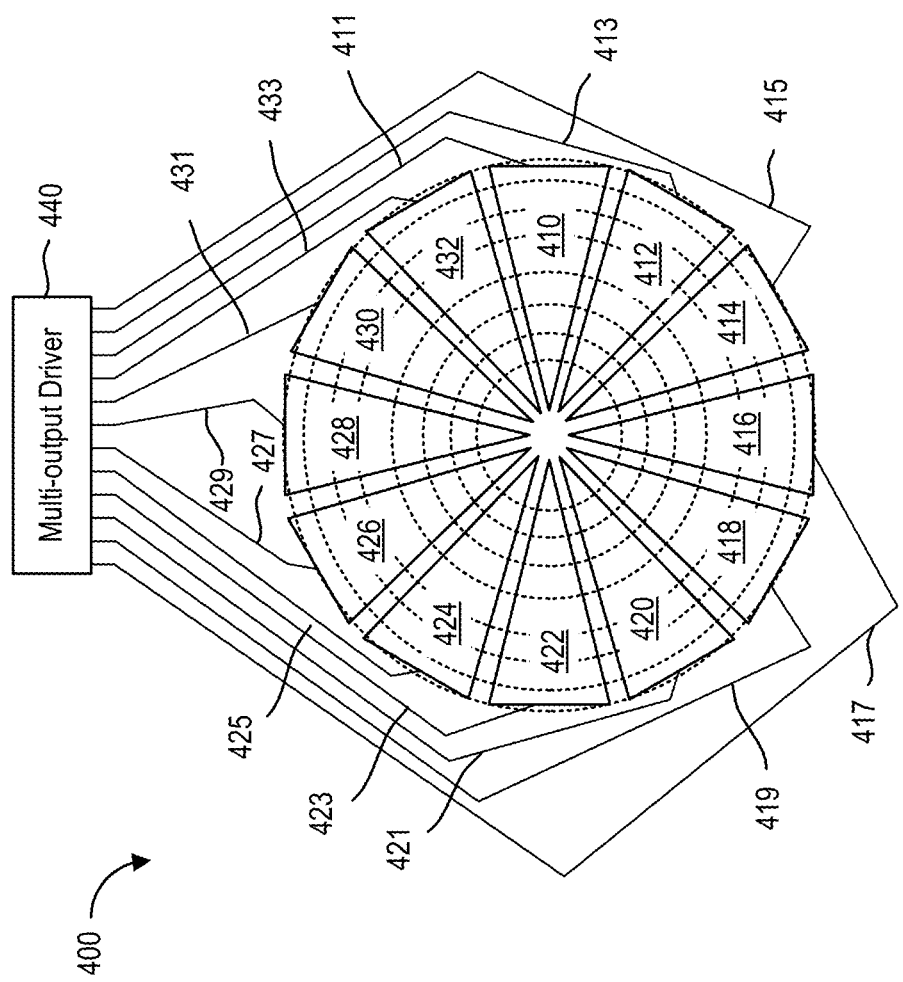
FIG. 4A illustrates a plan view of an astigmatic liquid crystal Fresnel lens including segmented electrodes according to an embodiment of the present disclosure.

In order to provide an independent voltage to the annular electrode 223, a via 276 is formed passing through the electrically insulating layer 272 from the bus line 253 to the annular electrode 223. Although not illustrated in FIG. 2D, similar bus lines and vias can be utilized to provide independent voltages to each of the concentric transparent electrodes. Accordingly, referring to both FIGS. 2B and 2D, the structure of the tunable liquid crystal Fresnel lens is apparent, with concentric electrodes formed adjacent the liquid crystal material 270. Application of independent voltages to the concentric electrodes enables the index of refraction of the liquid crystal material 270 to be varied in the lateral direction (i.e., in the x-y plane), resulting in a Fresnel lens that has a tunable and controllable focal length. Each of the annular electrodes can be electrically connected to one of a set of independent voltage sources, which are not shown in FIG. 2D for purposes of clarity, but are illustrated in FIG. 4A by multi-output driver 440, which provides a set of independent voltages that can also be referred to as a set of independent voltage signals.

Although common electrode 280 is illustrated in FIG. 2D as being planar, in other embodiments, a surface relief pattern could be utilized in conjunction with the structure shown in FIG. 2D.

Figure 2E:
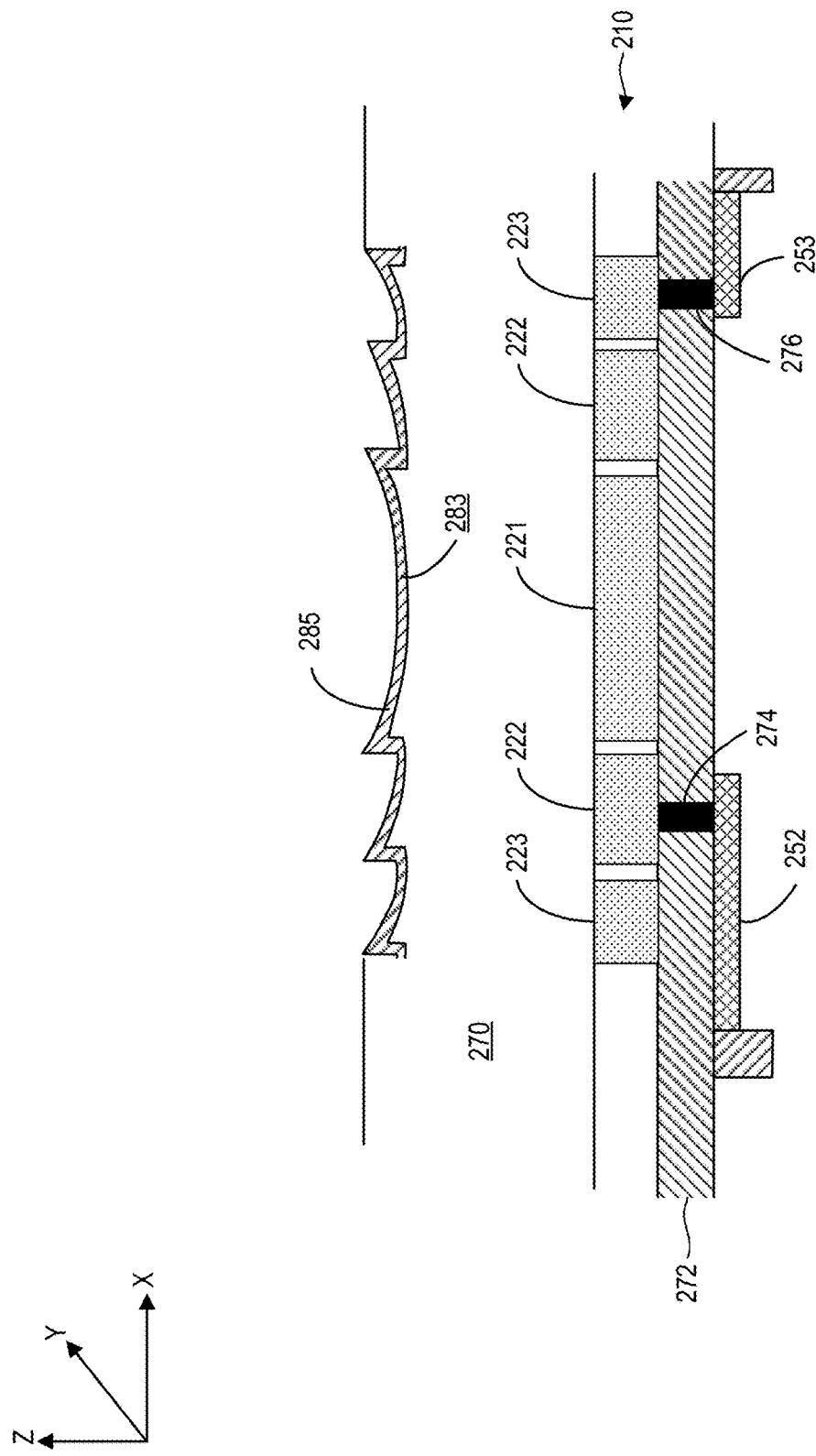
FIG. 2E illustrates a cross section view of a portion of an alternative liquid crystal Fresnel lens according to an embodiment of the present disclosure.

FIG. 2E illustrates a cross section view of a portion of an alternative liquid crystal Fresnel lens according to an embodiment of the present disclosure. As illustrated in FIG. 2E, rather than a planar common electrode as shown in FIG. 2D, common electrode 285 is formed on one surface of surface relief pattern 283, which is adjacent liquid crystal material 270. The liquid crystal material 270 is in electrical communication with common electrode 285. In this case, the operation of the liquid crystal Fresnel lens could utilize a uniform index of refraction as a function of position, in conjunction with surface relief pattern 283, to provide a lens having a predetermined focal length. In this case, each of the concentric electrodes 210 could be driven at an equal voltage, utilizing the geometric shape of surface relief pattern 283 and the difference in index of refraction between the liquid crystal material 270 and the surrounding material to provide the desired optical power.

In order to amplify and modify the lensing effect provided by the index of refraction of the liquid crystal in conjunction with the surface relief pattern, radial variation in index of refraction could be achieved by driving each of the concentric electrodes at different voltages as discussed herein. Moreover, in other embodiments, rather than a structure with the illustrated concentric electrodes 210, the liquid crystal material 270, and the common electrode 285 adjacent a surface relief pattern, the structure could be interchanged with the concentric electrodes 210 adjacent the surface relief pattern and vias passing in the z-direction from bus lines positioned below the liquid crystal material 270. The concentric electrodes 210 can be formed on a planar surface of a substrate as illustrated in FIG. 2E, or could be formed on surface relief pattern 283 in place of the common electrode 285 with the common electrode 285 being positioned on the opposing side of the liquid crystal material. One of ordinary skill in the art would recognize many variations, modifications, and alternatives.

Although the focal length of the liquid crystal Fresnel lens can be controlled to provide a predetermined spherical optical power, the lens illustrated in FIGS. 2B-2D does not provide for different focal lengths along the x-axis and the y-axis. In other words, the liquid crystal Fresnel lens does not enable astigmatic tunability. Additionally, in some embodiments, the optical power of the liquid crystal Fresnel lens illustrated in FIG. 2D may be limited and not high enough for some applications. In some applications, for example, in dual-mode reading glasses that can be operated in a focus-free mode in which the lenses have no optical power and in a focus mode in which the lenses have a predetermined optical power, it would be beneficial to not only provide electrically controllable optical power, but astigmatism correction for the user. Thus, dual-mode reading glasses that can provide for astigmatic imaging are desirable.

According to embodiments of the present disclosure, a tunable, astigmatic liquid crystal Fresnel lens is provided that provides adjustable focal length combined with astigmatic imaging that can provide for astigmatism correction for the user. Using these astigmatic, dual-mode reading glasses, a user could operate the glasses in a first mode, with no electrical power applied to the glasses. In this mode, the glasses would not have any optical power, but would not consume any electrical power. In a second mode, the focal length of the lenses in the glasses could be adjusted to provide, not only spherical optical power, but astigmatic imaging, resulting in a different focal length along different directions. As described herein, the orientation of the astigmatic axis can be controlled to correct for a range of astigmatic errors in the user's vision.

Figure 3A:
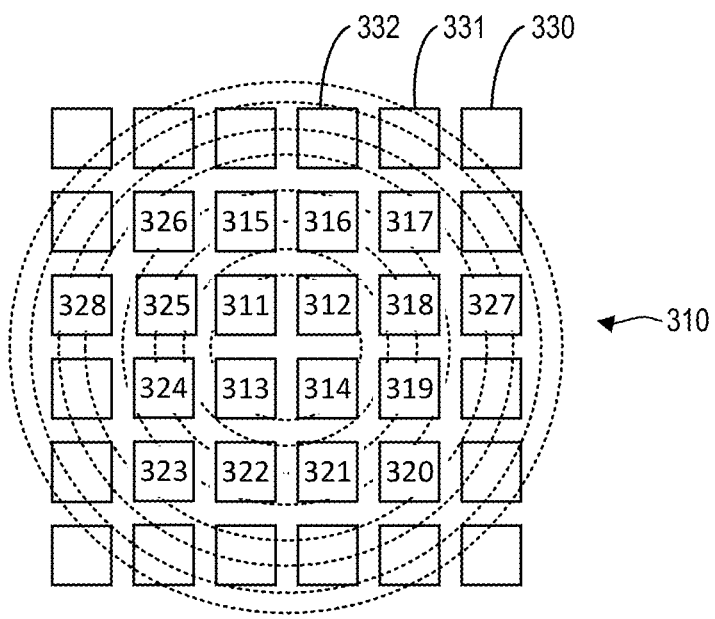
FIG. 3A illustrates a plan view of an astigmatic liquid crystal Fresnel lens including pixelated electrodes according to an embodiment of the present disclosure.

FIG. 3A illustrates a plan view of an astigmatic liquid crystal Fresnel lens including pixelated electrodes according to an embodiment of the present disclosure. In a manner similar to the concentric electrodes illustrated in FIG. 2B, pixelated electrodes 310 (i.e., transparent conductive electrodes) are an implementation of distributed electrodes that are distributed in a two-dimensional array configuration adjacent the liquid crystal material. The pixelated electrodes 310 are implemented as a two-dimensional array (i.e., a six-by-six array) in the embodiment illustrated in FIG. 3A, but this is not required by the present disclosure. In other embodiments, a larger or smaller number of pixelated electrodes are utilized, including pixelated electrodes of differing dimensions. As an example, since, in a Fresnel lens, the Fresnel sections decrease in size with increasing radius, the pixelated electrodes in the central portion of the Fresnel lens could be larger in size compared to the pixelated electrodes in the peripheral portion of the Fresnel lens. Therefore, the pixelated electrodes illustrated in FIG. 3A are merely exemplary and are not intended to limit the scope of the embodiments described in the present disclosure. Depending on the geometrical arrangement and the number of the pixelated electrodes 310, different techniques can be used to drive the pixelated electrodes 310, including direct drive, active matrix techniques including drive transistors, or the like. For purposes of clarity, independent voltage sources that can be connected to each of the pixelated electrodes, or to sets of pixelated electrodes, are not illustrated in FIG. 3A. However, these independent voltage sources, in the form of a multi-output driver, will be described in reference to FIG. 4A and one of skill in the art will appreciate that a multi-output driver providing independent voltage sources can be utilized in conjunction with pixelated electrodes 310 as illustrated in FIG. 3A to provide an independent voltage to each of the pixelated electrodes or sets of pixelated electrodes.

In order to fabricate pixelated electrodes 310, photolithography or other suitable printing techniques can be used to deposit an array of electrodes including electrodes 311-326. For purposes of clarity, only the central four rows and columns of electrodes are labeled in their entirety. The pixelated electrodes, or sets of pixelated electrodes, can each be electrically connected to one of a set of independent voltage sources, which are not shown in FIG. 3A for purposes of clarity, but are illustrated in FIG. 4A by multi-output driver 440, which provides a set of independent voltages that can also be referred to as a set of independent voltage signals.

Figure 3B:
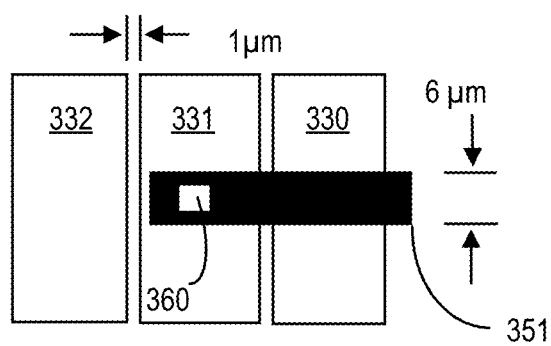
FIG. 3B illustrates a plan view of pixelated electrodes illustrated in FIG. 3A, a bus line, and a via providing electrical connectivity between one of the pixelated electrodes and the bus line.
Figure 3C:
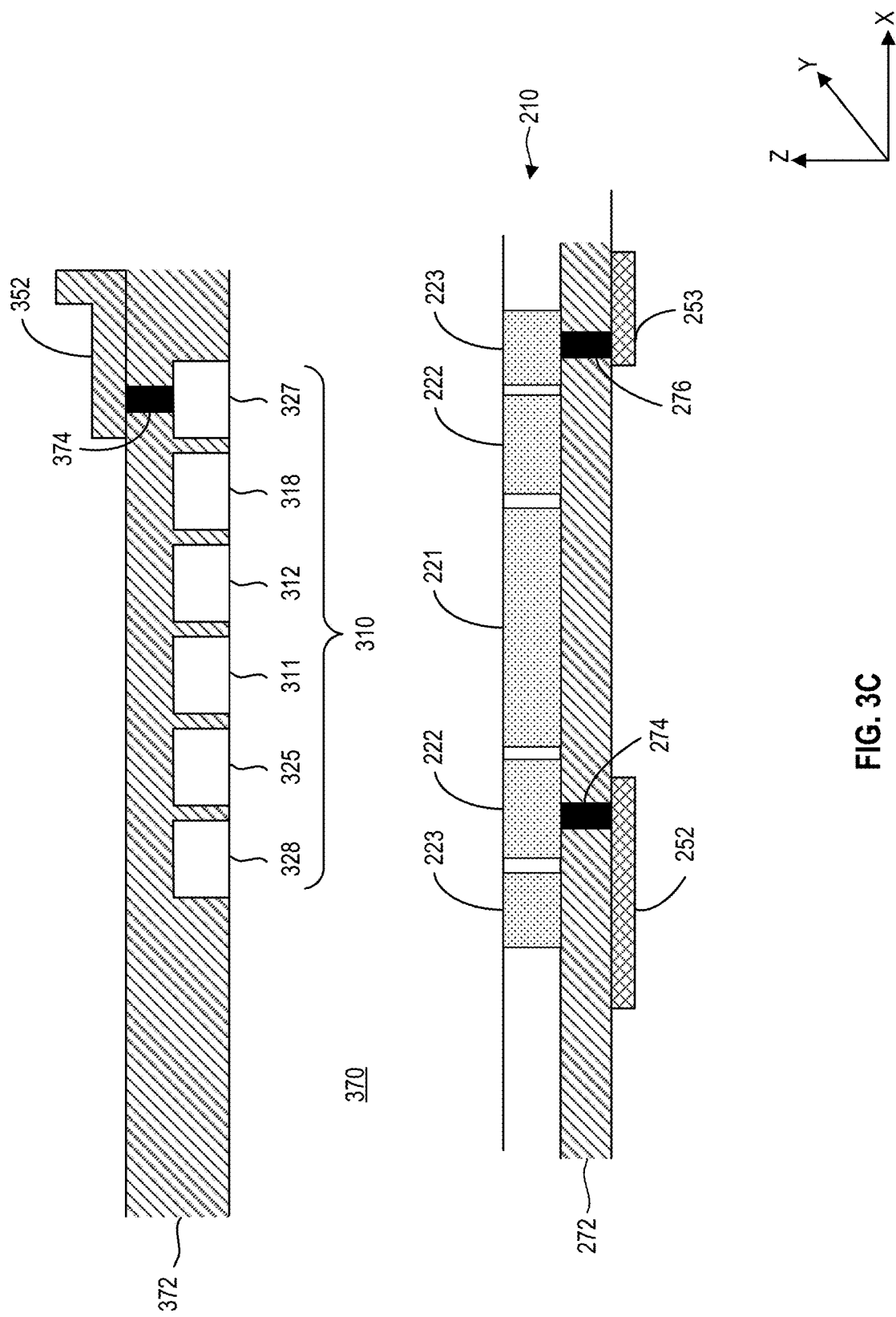
FIG. 3C illustrates a cross section view of a portion of the astigmatic liquid crystal Fresnel lens illustrated in FIG. 3A.

The central electrodes 311, 312, 313, and 314 correspond generally to the central region of the Fresnel lens and can be controlled to operate at independent voltages or a common voltage. As is illustrated in FIGS. 3A and 3C, central electrodes 311, 312, 313, and 314, which are positioned in the central region of the Fresnel lens, at least partially overlap in the lateral plane with center electrode 221. The intermediate electrodes 315-326 constitute electrodes that are peripheral to the central electrodes 311-314, but are positioned closer to the central region of the Fresnel lens than the pixelated electrodes that are positioned peripherally to the intermediate electrodes 315-326. Using the array of pixelated electrodes, the voltage applied to the liquid crystal material can be varied as a function of lateral position, providing a controllable spherical optical power in a manner similar to the embodiment illustrated in FIG. 2B.

Referring once again to FIG. 3A, by applying a voltage between each of the pixelated electrodes and the common electrode (not shown), the index of refraction of the liquid crystal material of the astigmatic liquid crystal Fresnel lens can be varied. By varying the index of refraction in a radial manner, with a higher index of refraction in the central portion of the astigmatic liquid crystal Fresnel lens, generally corresponding to the voltage applied to central electrodes 311, 312, 313, and 314, and a lower index of refraction in the peripheral portion of the astigmatic liquid crystal Fresnel lens, a lensing effect can be implemented, resulting in a predetermined focal length for the astigmatic liquid crystal Fresnel lens. In this example, with a higher index of refraction in the central portion of the astigmatic liquid crystal Fresnel lens, a positive lens is formed that is characterized by a predetermined focal length. Phase wrapping can be implemented at the intersection between adjacent pixelated electrodes to provide suitable optical power.

In contrast with the embodiment illustrated in FIG. 2B, the astigmatic liquid crystal Fresnel lens illustrated in FIG. 3A also provides astigmatic optical properties as described more fully below.

In order to provide for electrical connectivity to the pixelated electrodes, a set of bus lines is electrically connected to the pixelated electrodes. FIG. 3B illustrates a plan view of pixelated electrodes illustrated in FIG. 3A, a bus line, and a via providing electrical connectivity between one of the pixelated electrodes and the bus line. As illustrated in FIG. 3B, a bus line 351 provides electrical connection between drive electronics (not shown) and peripheral electrode 331. Although only electrical connection between the bus line 351 and the peripheral electrode 331 is illustrated in FIG. 3B, it will be appreciated that each of the pixelated electrodes can be individually addressed using independent bus lines, have several pixelated electrodes connected to a single bus line, or the like.

The plan view shown in FIG. 3B illustrates a structure suitable for use in providing separate and independent electrical connections to the pixelated electrodes. However, as discussed above in relation to the embodiment illustrated in FIG. 2B, in other embodiments, multiple transparent electrodes could be electrically connected to a single bus line.

Referring to FIG. 3B, the peripheral electrodes 330, 331, and 332 are illustrated. Bus line 351 is also shown in this plan view. A via 360 is provided in an electrically insulating layer (not shown in FIG. 3B, but illustrated in FIG. 3C) to provide for electrical contact between the peripheral electrode 331 and the bus line 351. Using this structure, a voltage applied to the bus line 351 can be present at the peripheral electrode 331 without making electrical contact with either the peripheral electrode 330 or the peripheral electrode 332. Thus, utilizing an array of pixelated electrodes and bus lines, which can also be referred to as linear electrodes, independent voltages can be established at each of the pixelated electrodes. In some embodiments, the spacing between adjacent pixelated electrodes can be on the order of 1 µm, the width of the bus lines can be on the order of 6 µm, and the dimensions of the via can be on the order of 3 µm by 3 µm. In other embodiments, these specific values can be adjusted depending on the particular application.

Thus, in this embodiment of the present disclosure, each pixelated electrode can be operated at an independent voltage with respect to the other pixelated electrodes. In some embodiments, rather than providing separate and independent electrical connections to each pixelated electrode, one or more pixelated electrodes can be electrically connected to a single bus line. As an example, the central electrodes 311-314, because they generally overlap with a dimension associated with a central region of the Fresnel lens, could be connected to a single bus line and driven at a single voltage. Similarly, pixelated electrodes located at similar radial distances could be connected to a single bus line and driven at a single voltage. As the radial distance from the center of the Fresnel lens increases, the dimensions of the pixelated electrodes could decrease in size and the portion of the pixelated electrodes connected to a single bus line could be decreased to provide finer control of the index of refraction of the liquid crystal and maintain the optical properties of the Fresnel lens. One of ordinary skill in the art would recognize many variations, modifications, and alternatives.

FIG. 3C illustrates a cross section view of a portion of the astigmatic liquid crystal Fresnel lens illustrated in FIG. 3A. For purposes of clarity, only the central portion of the liquid crystal Fresnel lens is illustrated, but it will be appreciated that the electrical and optical structures illustrated in FIG. 3C will be applicable to other portions of the liquid crystal Fresnel lens. Substrates supporting structures illustrated in FIG. 3C are not illustrated for purposes of clarity, but will contain the liquid crystal material and form a housing defined by a predetermined index of refraction.

Referring to FIG. 3C, a liquid crystal material 370 is positioned between concentric electrodes 210 and pixelated electrodes 310. In the embodiment illustrated in FIG. 3C, concentric electrodes 210 are positioned facing the pixelated electrodes 310. The liquid crystal material 370 is in electrical communication with concentric electrodes 210 and pixelated electrodes 310. In a manner similar to the liquid crystal Fresnel lens shown in FIGS. 1 and 2A, a Fresnel lens is formed by varying the index of refraction as a function of lateral position. Portions of the pixelated electrodes 310 are illustrated by a single row of pixelated electrodes including central electrodes 311 and 312, intermediate electrodes 318 and 325, and peripheral electrodes 327 and 328. In this embodiment, the liquid crystal material 370 has a uniform thickness as a function of lateral position (i.e., the x-y plane). In other embodiments, as illustrated in FIG. 2A, the liquid crystal material 370 can have a variation in layer thickness in the lateral plane to form additional Fresnel sections as appropriate to the particular application. Thus, in this embodiment, the lensing effect is formed as a result of variation in index of refraction of the liquid crystal material 370 resulting from variation in the applied voltage as a function of lateral position.

As illustrated in FIG. 3C, an electrically insulating layer 372 is disposed between the pixelated electrodes 310 and the bus line 352. In order to provide for electrical connection between the bus line 352 and the peripheral electrode 327, a via 374 is formed passing through the electrically insulating layer 372 from the bus line 352 to the peripheral electrode 327. For connections to the central electrodes and the intermediate electrodes, additional vias (not shown) are provided in conjunction with additional bus lines (not shown). As a result, independent voltages can be provided to each of the pixelated electrodes, multiple electrodes can be driven at a single voltage, or the like.

In addition to the pixelated electrodes 310, a set of concentric electrodes 210 is also provided in this implementation. Portions of concentric electrodes 210 are illustrated by the center electrode 221, which is surrounded by the annular electrode 222, which, in turn, is surrounded by the annular electrode 223. In a manner similar to electrically insulating layer 372, bus line 352, and via 374, an electrically insulating layer can be disposed between concentric electrodes 210 and the corresponding bus lines. Thus, similar to the electrical connections for the pixelated electrodes 310, in order to provide for electrical connection between the bus lines and the concentric electrodes 210, an electrically insulating layer in combination with vias can be utilized.

As illustrated in FIG. 3C, an electrically insulating layer 272 is disposed between concentric electrodes 210 and the bus line 252 and the bus line 253. In order to provide for electrical connection between the bus line 252 and the annular electrode 222, a via 274 is formed passing through the electrically insulating layer 272 from the bus line 252 to the annular electrode 222. As a result, although the bus line 252 passes over the annular electrode 223, there is no electrical connection between the bus line 252 and the annular electrode 223. Similarly, the other annular electrodes that are peripheral to the annular electrode 222 are electrically isolated from the bus line 252 by the presence of the electrically insulating layer 272.

In order to provide an independent voltage to the annular electrode 223, a via 276 is formed passing through the electrically insulating layer 272 from the bus line 253 to the annular electrode 223. One of ordinary skill in the art would recognize many variations, modifications, and alternatives.

In operation, voltages can be applied to either pixelated electrodes 310, concentric electrodes 210, or both pixelated electrodes 310 and concentric electrodes 210. Thus, referring to FIG. 3C, the structure of the tunable astigmatic liquid crystal Fresnel lens is apparent in this embodiment, with the pixelated electrodes and the concentric electrodes being able to be operated in a combined manner. Application of independent voltages to the concentric electrodes 210 enables the index of refraction of the liquid crystal material 370 to be varied in the radial direction, resulting in a liquid crystal Fresnel lens that introduces spherical optical power and has a tunable and controllable focal length. Application of additional independent voltages to the pixelated electrodes 310 enables the index of refraction of the liquid crystal material 370 to be varied in the lateral direction (i.e., the x-y plane), enabling introduction of additional spherical optical power and/or astigmatism and control of the rotation of the astigmatic axis. Thus, in applications, for example, in dual-mode reading glasses that can be operated in a focus-free mode and in a focus mode, the embodiment illustrated in FIG. 3C can provide electrically controllable optical power including astigmatism correction for the user. Each of the pixelated electrodes can be electrically connected to one of a set of independent voltage sources and each of the concentric electrodes can be electrically connected to one of a second set of independent voltage sources. Although these sets of independent voltage sources are not illustrated in FIG. 3C for purposes of clarity, they are illustrated and discussed in relation to FIG. 4A by multi-output driver 440, which provides one or more sets of independent voltages that can also be referred to as one or more sets of independent voltage signals.

Figure 3D:
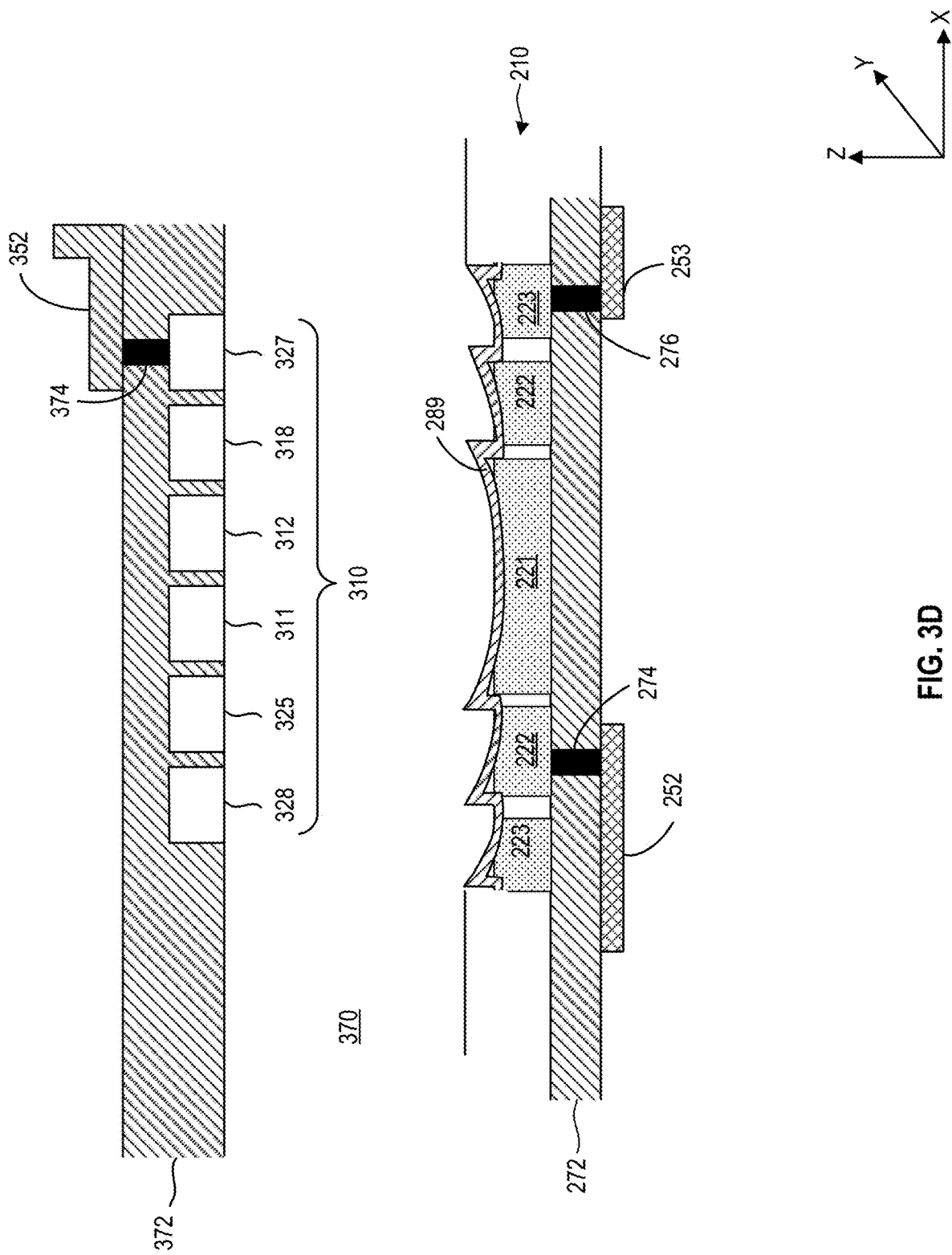
FIG. 3D illustrates a cross section view of a portion of an astigmatic liquid crystal Fresnel lens according to an alternative embodiment of the present disclosure.

FIG. 3D illustrates a cross section view of a portion of an astigmatic liquid crystal Fresnel lens according to an alternative embodiment of the present disclosure. In the embodiment illustrated in FIG. 3D, patterned surface 289 has been integrated with concentric electrodes 210 to provide for additional spherical optical power. In this embodiment, if a uniform voltage is applied to applied to the pixelated electrodes, i.e., the central electrodes 311 and 312, the intermediate electrodes 318 and 325, and the peripheral electrodes 327 and 328, and a uniform voltage is applied to the concentric electrodes 210, i.e., the center electrode 221, the annular electrode 222, and the annular electrode 223, the presence of the patterned surface 289, in combination with liquid crystal material 370, can result in the generation of spherical optical power. This implementation would be similar to that achieved using the structure illustrated in FIG. 2A, with uniform voltages on both drive electrode 204 and common electrode 206.

By applying independent voltages to the concentric electrodes 210, i.e., the center electrode 221, the annular electrode 222, and the annular electrode 223, additional spherical optical power can be introduced. By applying independent voltages to the pixelated electrodes 310, i.e., the central electrodes 311 and 312, the intermediate electrodes 318 and 325, and the peripheral electrodes 327 and 328, additional spherical optical power and/or astigmatism and control of the rotation of the astigmatic axis can be introduced.

Figure 3E:
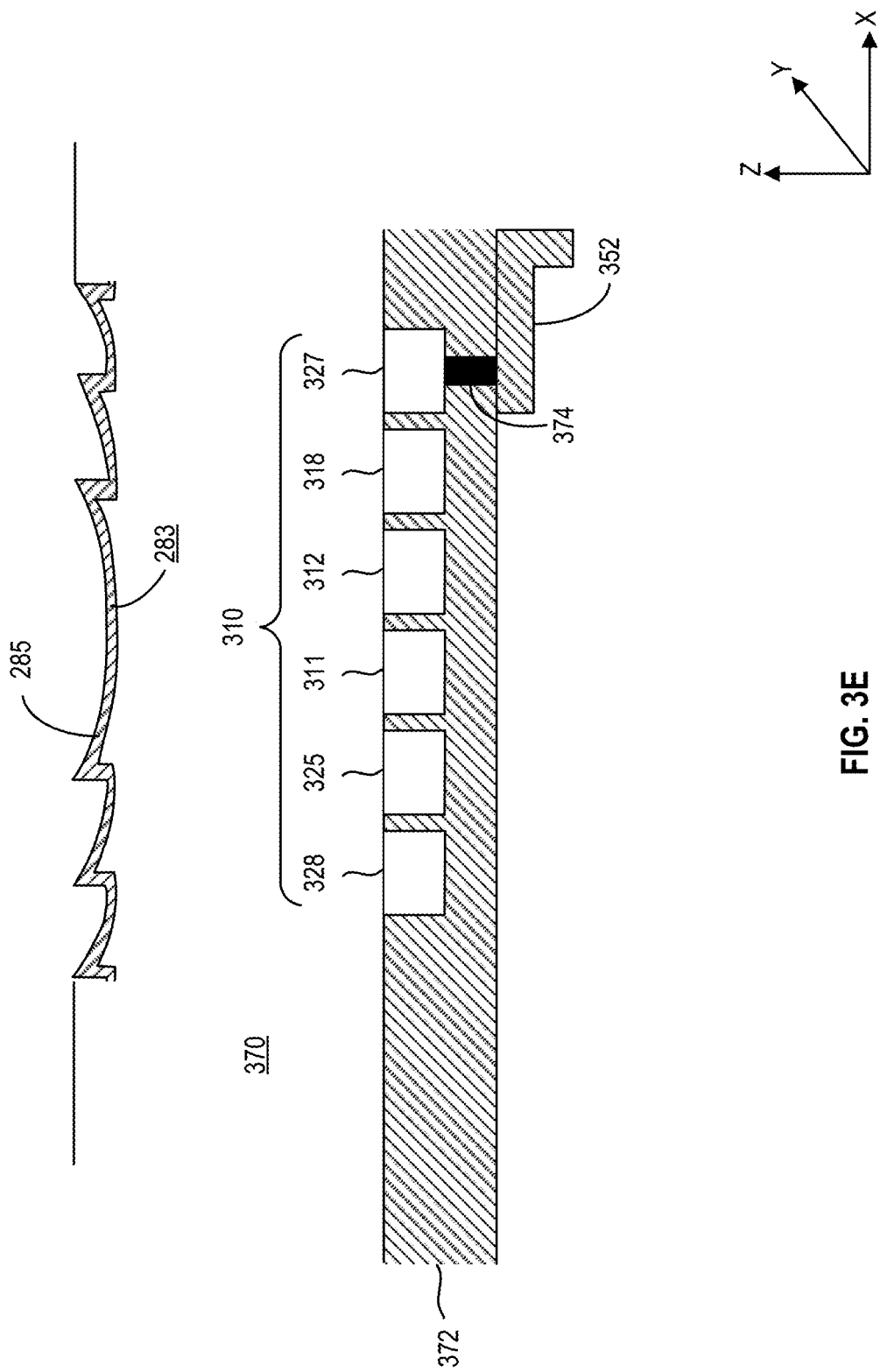
FIG. 3E illustrates a cross section view of a portion of an astigmatic liquid crystal Fresnel lens according to another alternative embodiment of the present disclosure.

FIG. 3E illustrates a cross section view of a portion of an astigmatic liquid crystal Fresnel lens according to another alternative embodiment of the present disclosure. In the embodiment illustrated in FIG. 3E, a set of pixelated electrodes 310 are utilized in combination with common electrode 285 that is formed on one surface of surface relief pattern 283, which is adjacent liquid crystal material 370. The liquid crystal material 370 is in electrical communication with the pixelated electrodes 310 and the common electrode 285. In this case, spherical optical power could be introduced by utilizing a uniform index of refraction as a function of position, in conjunction with surface relief pattern 283, to provide a lens having a predetermined focal length. In this case, each of the pixelated electrodes 310 could be driven at an equal voltage, utilizing the geometric shape of surface relief pattern 283 and the difference in index of refraction between the liquid crystal material 370 and the surrounding material to provide the desired spherical optical power.

By applying independent voltages to the pixelated electrodes 310, i.e., the central electrodes 311 and 312, the intermediate electrodes 318 and 325, and the peripheral electrodes 327 and 328, additional spherical optical power and/or astigmatism and control of the rotation of the astigmatic axis can be introduced. One of ordinary skill in the art would recognize many variations, modifications, and alternatives.

As an example of the imaging capabilities of the astigmatic liquid crystal Fresnel lens, a cylindrical lens profile can be implemented.

Figure 3F:
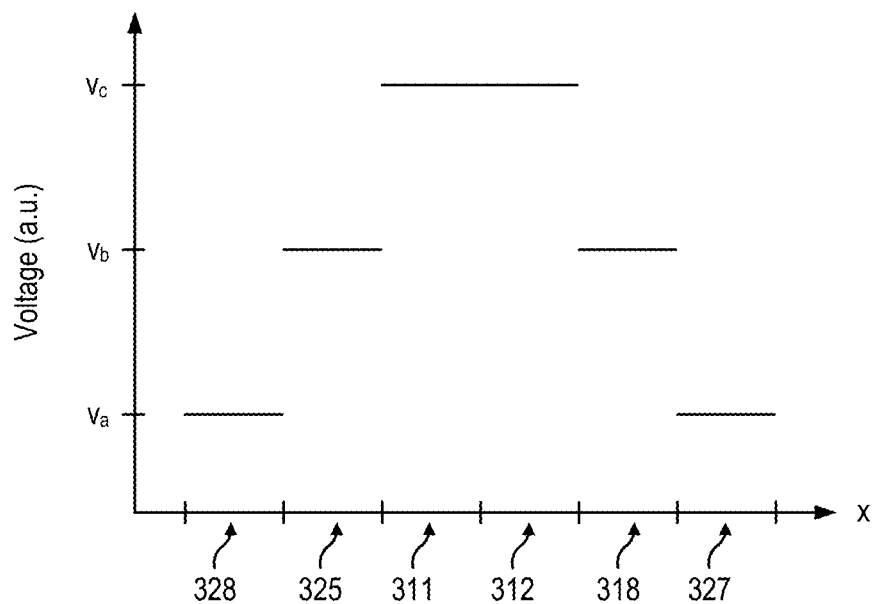
FIG. 3F is a plot illustrating application of voltage as a function of position to form a cylindrical lens according to an embodiment of the present disclosure.

FIG. 3F is a plot illustrating application of voltage as a function of position to form a cylindrical lens according to an embodiment of the present disclosure. In FIG. 3F, the voltage present at each of the pixelated electrodes illustrated in FIG. 3C is shown in arbitrary units. The voltage present at the central electrodes 311 and 312 is $V_c$, the voltage present at the intermediate electrodes 318 and 325 is $V_b$, and the voltage present at the peripheral electrodes 327 and 328 is $V_a$. In this implementation, the voltage at the pixelated electrodes in the columns including the illustrated electrodes would be uniform, providing for a voltage variation along the x-axis, but a uniform voltage for each column oriented along the y-axis.

The application of the varying voltage along the x-axis will result in a variation in the index of refraction of the liquid crystal material along the x-axis in response to the voltage variation.

Figure 3G:
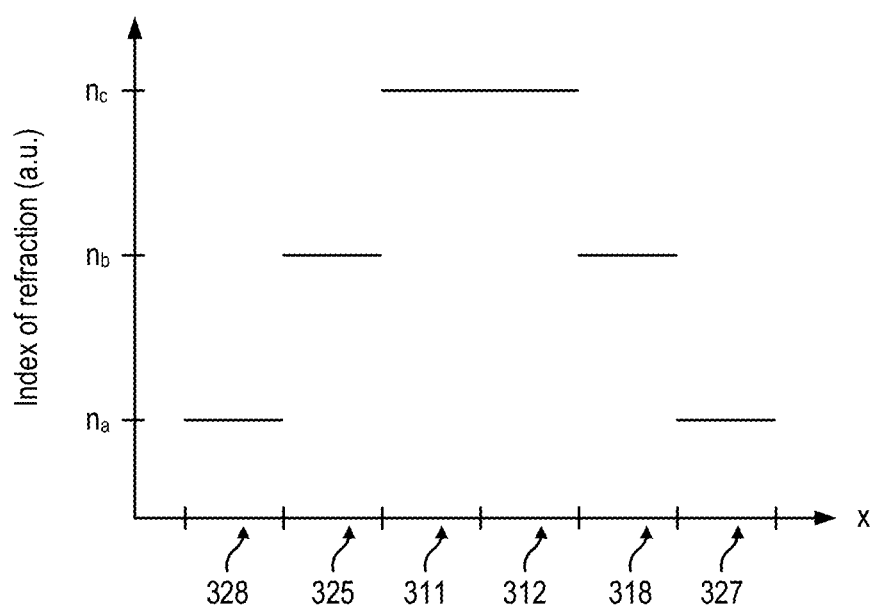
FIG. 3G is a plot illustrating index of refraction as a function of position forming a cylindrical lens according to an embodiment of the present disclosure.

FIG. 3G is a plot illustrating index of refraction as a function of position forming a cylindrical lens according to an embodiment of the present disclosure. As illustrated in FIG. 3G, the index of refraction corresponding to each of the illustrated pixelated electrodes varies as a function of lateral position. In FIG. 3G, the index of refraction corresponding to each of the pixelated electrodes illustrated in FIGS. 3C and 3D is shown in arbitrary units. The index of refraction corresponding to the central electrodes 311 and 312 is $n_c$, the index of refraction corresponding to the intermediate electrodes 318 and 325 is $n_b$, and the index of refraction corresponding to the peripheral electrodes 327 and 328 is $n_a$. In this implementation, the index of refraction corresponding to the pixelated electrodes in the columns including the illustrated electrodes would be uniform, providing for a variation in index of refraction along the x-axis, but a uniform index of refraction profile for each column oriented along the y-axis. As a result of this index of refraction variation along the x-axis, the liquid crystal Fresnel lens will form a positive cylindrical lens forming a focal line parallel to the y-axis Although the embodiment illustrated in FIGS. 3F-3G forms a positive cylindrical lens with the axis of the cylinder aligned with the y-axis, this is not required and other embodiments form other lens structures. In particular, it should be noted that since the pixelated electrodes are each individually controllable in some embodiments, not only spherical optical power, but a predetermined level of astigmatism as well as rotation of the astigmatic axis, are provided by embodiments of the present disclosure. As an example, in order to form a lens characterized by only spherical optical power, the index of refraction profile can be varied as a function of lateral position, with a uniformly varying index of refraction that decreases from a high value at the center of the liquid crystal Fresnel lens to a low value at the periphery of the liquid crystal Fresnel lens. In order to introduce astigmatism in addition to the spherical optical power, for example, along the x-axis, the variation in index of refraction along the x-axis can be varied to increase the variation of the index of refraction profile, decreasing the index of refraction at the periphery along the x-axis more than at the periphery along the y-axis.

Because the pixelated electrodes are individually addressable in some embodiments, the rotation of the astigmatic axis can be controlled to provide a predetermined axis of rotation. As an example, in order to form a lens having spherical optical power as well as astigmatism along a direction oriented at 45° to the x-axis, a voltage profile would be applied to the pixelated electrodes that would result in an index of refraction profile in which the index of refraction is highest at the center of the liquid crystal Fresnel lens and the voltage would decrease with lateral position. The decrease would be greatest along the direction oriented at 45° to the x-axis. Accordingly, in terms of applied voltage, the voltage at the top-right pixelated electrode and the bottom-left pixelated electrode would be the lowest. The voltage at the top-left pixelated electrode and the bottom-right electrode would be an intermediate voltage level between the voltage at the center of the liquid crystal Fresnel lens and the voltage at the top-right and bottom-left pixelated electrodes. By controlling the voltages at the various pixelated electrodes, a predetermined combination of spherical and astigmatic optical power, at an arbitrary rotation axis, can be achieved, thereby providing a tunable astigmatic liquid crystal Fresnel lens.

Depending on the specific spherical optical power and astigmatism utilized in a particular application, the combination of the spherical optical power resulting from application of predetermined voltages to the concentric electrodes and additional spherical optical power and/or astigmatism resulting from application of predetermined voltages to the pixelated electrodes, a wide range of optical powers and astigmatism can be achieved. As with other embodiments, phase wrapping can be implemented at the intersection between adjacent concentric electrodes and/or pixelated electrodes to provide suitable optical power. One of ordinary skill in the art would recognize many variations, modifications, and alternatives.

FIG. 4A illustrates a plan view of an astigmatic liquid crystal Fresnel lens including segmented electrodes according to an embodiment of the present disclosure. In the astigmatic liquid crystal Fresnel lens 400 illustrated in FIG. 4A, segmented electrodes (i.e., transparent conductive electrodes) are formed, each in the shape of a sector, which is the part of a circle enclosed by two radii of the circle and their intercepted arc. Thus, in the embodiment illustrated in FIG. 4A, the distributed electrodes are implemented as a two dimensional distribution of electrodes disposed as sectors of a circle. For purposes of clarity, each sector is referred to as a segment. In the illustrated embodiment, twelve sectors or segments are utilized to provide twelve segmented electrodes 410, 412, 414, 416, 418, 420, 422, 424, 426, 428, 430, and 432. As will be evident to one of skill in the art, the number of segments is not limited to twelve segments and a greater number or lesser number can be utilized as appropriate to the particular application. Additionally, although the twelve sectors or segments illustrated in FIG. 4A are characterized by the same intercepted arc (i.e., 30°), this is not required and other implementations can use sectors or segments that have differing intercepted arcs as a function of angle. Concentric electrodes are shown by dashed lines in FIG. 4A.

Referring to FIG. 4A, segmented electrodes 410, 412, 414, 416, 418, 420, 422, 424, 426, 428, 430, and 432 are distributed adjacent to each other and cover a range of angles, with respect to the x-axis of 0° to 30°, 30° to 60°, 60° to 90°, 90° to 120°, 120° to 150°, 150° to 180°, 180° to 210°, 210° to 240°, 240° to 270°, 270 to 300°, 300° to 330°, and 330° to 360°. In other embodiments using a different number of segmented electrodes defined by sectors of a circle, the angular coverage of each segmented electrode will vary accordingly.

Each of the segmented electrodes 410, 412, 414, 416, 418, 420, 422, 424, 426, 428, 430, and 432 is individually electrically connected to a multi-output driver 440, also referred to as a set of independent voltage sources, via bus lines 411, 413, 415, 417, 419, 421, 423, 425, 427, 429, 431, and 433, respectively. Accordingly, each of the segmented electrodes 410, 412, 414, 416, 418, 420, 422, 424, 426, 428, 430, and 432 can be individually provided with a predetermined voltage, also referred to as a voltage signal, thereby applying a predetermined voltage to the liquid crystal material disposed adjacent each of the segmented electrodes. Although multi-output driver 440 is illustrated in FIG. 4A, it will be appreciated that other suitable voltage drivers that provide a set of independent voltage sources, thereby providing a set of independent voltage signals, can be utilized.

As discussed in relation to the pixelated electrodes illustrated in FIG. 3A, photolithography or other suitable printing techniques can be used to deposit the segmented electrodes, each having a predetermined radial size, intercepted arc, and spacing between adjacent electrodes. Thus, although the twelve segmented electrodes illustrated in FIG. 4A are referred to as covering a range of angles that are continuous, for example, 0° to 30°, 30° to 60°, etc., it will be appreciated that each of the segmented electrodes is electrically isolated from the other segmented electrodes and will include an insulating space or insulating material between adjacent electrodes.

In order to introduce astigmatic optical power, for example, a cylindrical lens aligned with the y-axis, the voltage applied to segmented electrode 416 and segmented electrode 428 could be higher than the voltage applied to segmented electrodes 410 and 422. Voltages applied to segmented electrodes between these sets can be at intermediate voltage levels. As a result of the higher voltage along the y-axis, the index of refraction of the liquid crystal material adjacent segmented electrode 416 and segmented electrode 428 will be higher than the index of refraction on the left and right sides of segmented electrodes 410 and 422, respectively. As a result, a cylindrical lens will be formed aligned with the y-axis.

As illustrated in FIG. 4A, the astigmatic liquid crystal Fresnel lens 400 can incorporate concentric electrodes (shown by dashed lines) and segmented electrodes according to an embodiment of the present disclosure. Thus, in a manner similar to the astigmatic liquid crystal Fresnel lens illustrated in FIG. 3C, pixelated electrodes can be replaced with segmented electrodes and utilized in conjunction with concentric electrodes. One of ordinary skill in the art would recognize many variations, modifications, and alternatives.

Thus, in an embodiment, a liquid crystal material is positioned between a common electrode and segmented electrodes. Additionally, concentric electrodes can be utilized in conjunction with the segmented electrodes. In an embodiment, the liquid crystal material has a uniform thickness as a function of lateral position (i.e., the x-y plane). Thus, in this embodiment, the Fresnel lens structure providing spherical optical power can be formed as a result of variation in index of refraction of the liquid crystal material resulting from variation in the applied voltage as a function of lateral position as the concentric electrodes are driven at different voltages, while either additional spherical optical power and/or the astigmatic optical power can be formed as a result of variation in index of refraction of the liquid crystal material resulting from variation in the applied voltage as a function of angle, for example, with respect to the x-axis, as the segmented electrodes are driven at different voltages.

Referring to FIG. 4A, in operation, voltages are applied to concentric electrodes (shown by dashed lines) using a driver (not shown) in order to provide a predetermined spherical optical power and voltages are applied to segmented electrodes 410-432 using multi-output driver 440 to provide additional spherical optical power and/or astigmatic optical power. Thus, referring to FIG. 4A, the structure of the tunable astigmatic liquid crystal Fresnel lens 400 is apparent in this embodiment, with the segmented electrodes and the concentric electrodes being able to be operated in a combined manner. Application of independent voltages to the concentric electrodes enables the index of refraction of the liquid crystal material to be varied in the radial direction, resulting in a liquid crystal Fresnel lens that introduces spherical optical power and has a tunable and controllable focal length. Application of additional independent voltages using the multi-output driver 440 to the segmented electrodes 410-432 enables the index of refraction of the liquid crystal material to be varied as a function of angle (i.e., in polar coordinates), for example, with respect to the x-axis, enabling introduction of astigmatism and control of the rotation of the astigmatic axis. Thus, in applications, for example, in dual-mode reading glasses that can be operated in a focus-free mode and in a focus mode, the embodiment illustrated in FIG. 4A can provide electrically controllable optical power including astigmatism correction for the user.

Depending on the specific spherical optical power and astigmatism utilized in a particular application, the combination of the spherical optical power resulting from application of predetermined voltages to the concentric electrodes and astigmatism resulting from application of predetermined voltages to the segmented electrodes, a wide range of optical powers and astigmatism can be achieved. As with other embodiments, phase wrapping can be implemented at the intersection between adjacent concentric electrodes and/or segmented electrodes to provide suitable optical power. One of ordinary skill in the art would recognize many variations, modifications, and alternatives.

Utilizing segmented electrodes 410, 412, 414, 416, 418, 420, 422, 424, 426, 428, 430, and 432, the voltage applied to the liquid crystal material can be varied as a function of angle (i.e., in polar coordinates), for example, with respect to the x-axis, providing a controllable astigmatic optical power. As an example, the voltage at the set of opposing segmented electrodes 410 and 422 can be set at a first level appropriate to generate a first index of refraction $n_1$, the voltage at the set of opposing segmented electrodes 412 and 424 can be set at a second level appropriate to generate a second index of refraction $n_2$, the voltage at the set of opposing segmented electrodes 414 and 426 can be set at a third level appropriate to generate a third index of refraction $n_3$, and similarly for other sets of opposing pairs of segmented electrodes. Thus, the astigmatic liquid crystal Fresnel lens 400 will produce astigmatic focusing of an incident plane wave as spherical optical power can be introduced and the liquid crystal material adjacent each of the sets of opposing segments can be characterized by a different index of refraction, resulting in focusing of light passing through each of the segmented electrodes and the adjacent liquid crystal material at a different focal plane. Given the different focal planes, the image formed by a plane wave passing through the astigmatic liquid crystal Fresnel lens 400 can be a line focus, which correlates with the desired astigmatism. By modifying the voltages applied to the sets of opposing segmented electrodes, the axis of rotation of the astigmatism axis can be rotated.

Figure 4B:
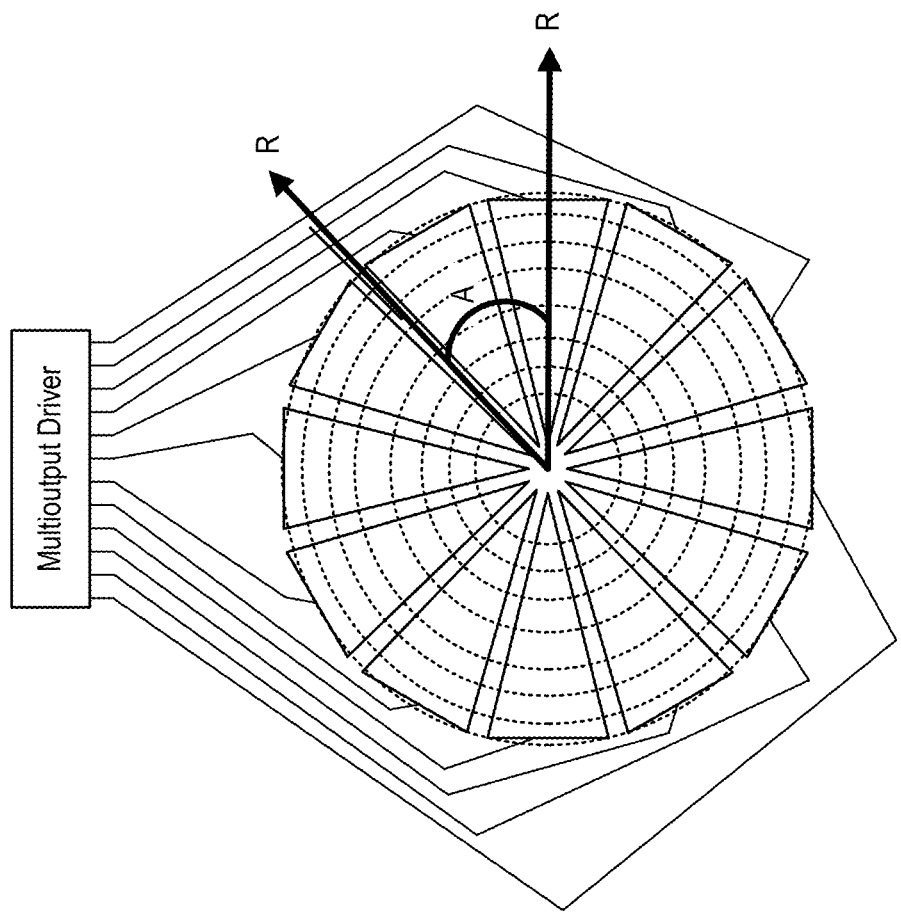
FIG. 4B illustrates a plan view of geometric parameters associated with the segmented electrodes illustrated in FIG. 4A.

FIG. 4B illustrates a plan view of geometric parameters associated with the segmented electrodes illustrated in FIG. 4A. As illustrated in FIG. 4B, the radial distance along the segmented electrodes and the angle of the segmented electrode, with respect to the x-axis, can be used to compute the phase as a function of position. In the following example, a cylindrical lens is formed with the axis of the cylinder aligned with the horizontal axis. Along the horizontal axis, the phase of light is $(F_1 R)^2$, where $F_1 = \infty$, which indicates that, along this direction, there is no optical power. This demonstrates that light oriented perpendicular to the axis of the cylinder is not focused as appropriate to a cylindrical lens. Along the vertical axis, the phase of light is $(F_2 R)^2$, where $F_2$ is variable, for example, 1000 mm, 500 mm, 333 mm, or the like. The focal length of the light as a function of angle is $$F(A) = \sqrt{(F_1 \cos A)^2 + (F_2 \sin A)^2}.$$

In some embodiments, the maximum radial distance is 15 mm. Relating the index of refraction of the liquid crystal material to the applied voltage provides the phase associated with the liquid crystal material and the focal lengths can be computed.

Figure 5:
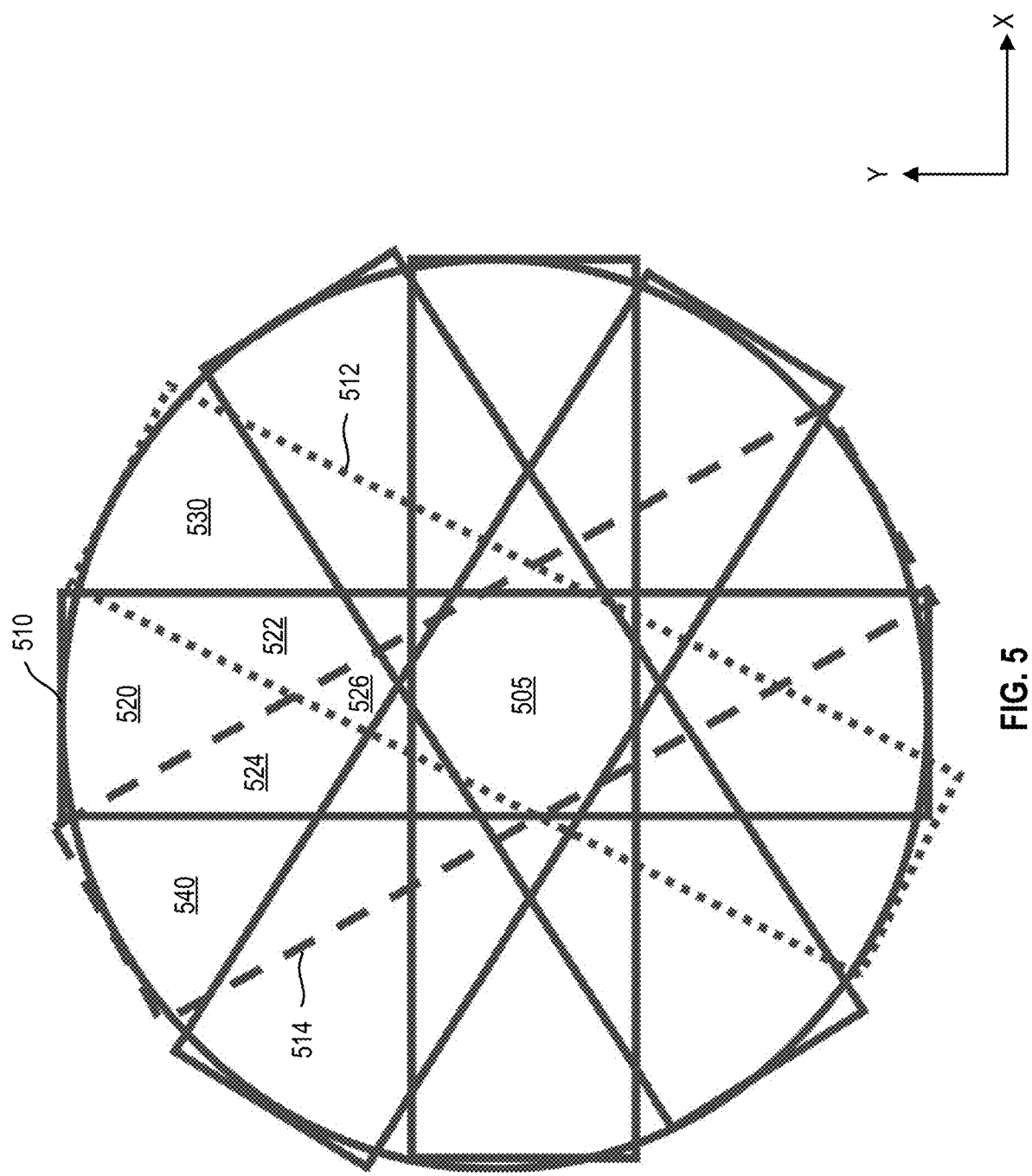
FIG. 5 illustrates a plan view of an alternative electrode arraignment according to an embodiment of the present disclosure.

FIG. 5 illustrates a plan view of an alternative electrode arraignment according to an embodiment of the present disclosure. As an alternative to the segmented electrodes illustrated in FIGS. 4A and 4B, the embodiment illustrated in FIG. 5 utilizes an alternative electrode arrangement that can be utilized to implement cylindrical optical power with a number of astigmatism axes. As illustrated in FIG. 5, a series of rectangles are oriented at different angles in order to provide coverage over the circle 505. Rectangle 510, represented by a solid outline, is oriented at 0° with respect to the y-axis, rectangle 512, represented by a dotted outline, is oriented at +30° with respect to the y-axis, and rectangle 514, represented by a dashed outline, is oriented at −30° with respect to the y-axis. In this embodiment, in which the rectangles overlap with each other to provide coverage for the circle 505, portions of the rectangles, generally defined by overlap regions between a given rectangle and other rectangles, can be utilized to define electrode geometry.

As an example, considering the rectangles 510, 512, and 514 and the upper half of the circle 505, an electrode 520 could be defined by an area over which the rectangle 510 does not overlap with the rectangles 512 and 514. Accordingly, the electrode 520, with a segment or sector shape, can be defined. In order to provide a variation in index of refraction in the liquid crystal material adjacent the upper portion of the rectangle 510, as discussed in relation to the segmented electrode 428 above, electrode 520 can be operated at a predetermined voltage. In addition to the electrode 520, the overlap between the rectangles 510 and 512 can be used to define an electrode 522. The overlap between the rectangles 510 and 514 can be used to define an electrode 524. The electrode 526 is defined by the overlap between the rectangles 510, 512, and 514. Similarly for the rectangles 512 and 514, similar overlap analysis can be used to define additional electrodes. As an example, the areas over which the rectangles 512 and 514 do not overlap with the electrode 510 can be used to define electrodes 530 and 540, respectively.

Therefore, to provide a variation in differing regions of the circle 505, particularly cylindrical optical power, the electrodes 520, 522, 524, and 526 can be utilized to apply a set of predetermined voltages adjacent each of these electrodes. Depending on the density and accuracy desired, additional electrodes can be defined in association with overlap regions with smaller dimensions. Thus, in addition to the segmented electrodes illustrated in FIGS. 4A and 4B, other electrode designs can be implemented to implement cylindrical optical power.

Figure 6:
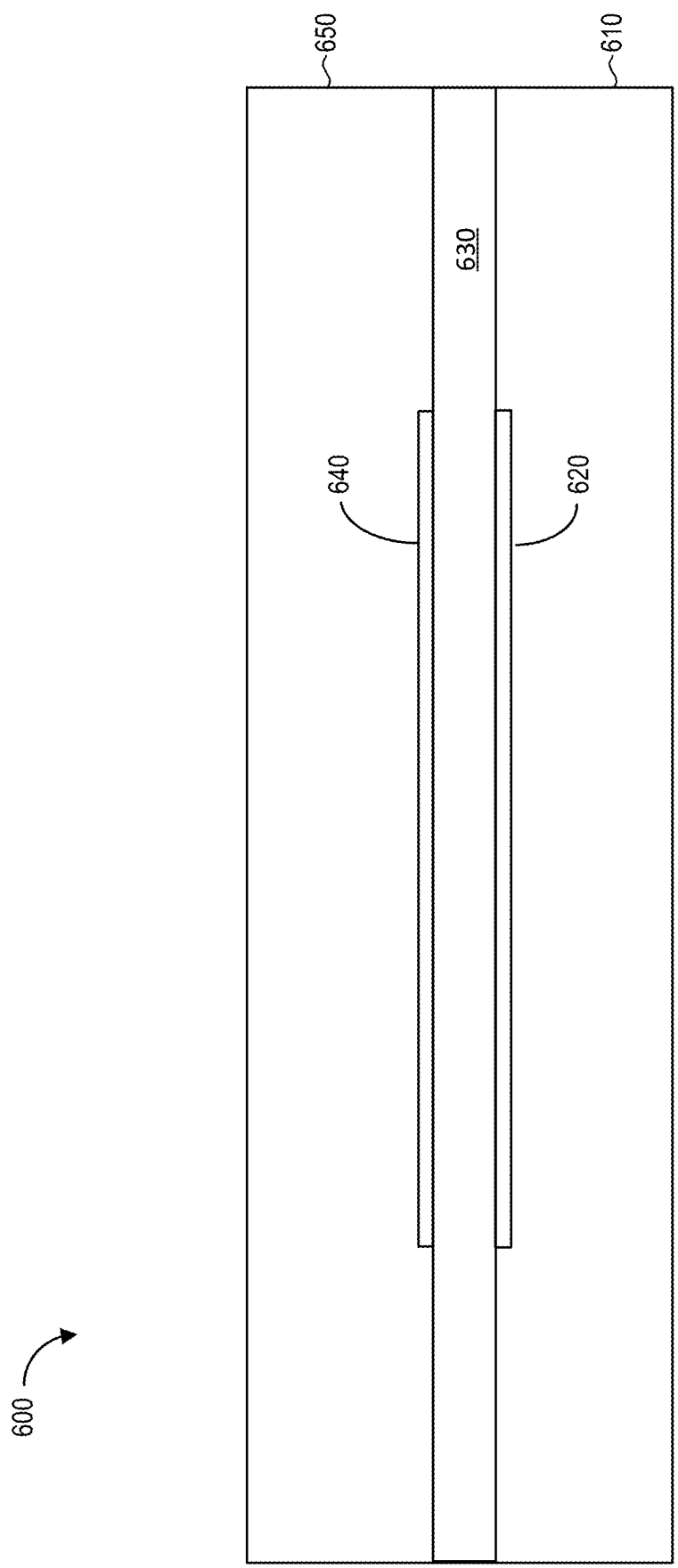
FIG. 6 illustrates a cross section view of an astigmatic resistive bridge liquid crystal Fresnel lens.

FIG. 6 illustrates a cross section view of an astigmatic resistive bridge liquid crystal Fresnel lens. The embodiment illustrated in FIG. 6 shares common structures with the embodiments discussed previously, and the discussion provided into these embodiments is applicable to the embodiment illustrated in FIGS. 6-9 as appropriate.

As illustrated in FIG. 6, astigmatic resistive bridge liquid crystal Fresnel lens 600 includes a first substrate 610, a resistive bridge electrode structure 620, a liquid crystal material 630, a distributed electrode 640, and a second substrate 650. Liquid crystal material 630 is in electrical communication with resistive bridge electrode structure 620 and distributed electrode 640. As described more fully herein, the distributed electrode 640 can be implemented as a two-dimensional array of pixelated electrodes as illustrated in FIG. 3A or segmented electrodes as illustrated in FIG. 4A depending on the particular application.

In operation, voltages can be applied to either the resistive bridge electrode structure 620, the distributed electrodes 640, or both resistive bridge electrode structure 620 and distributed electrodes 640 to achieve different optical properties. Therefore, the structure of the tunable astigmatic resistive bridge liquid crystal Fresnel lens is apparent in this embodiment, with the resistive bridge electrode structure 620 and the distributed electrodes 640 being able to be operated in a combined manner. Application of one or more independent voltages to the resistive bridge electrodes enables the index of refraction of the liquid crystal material 630 to be varied in the radial direction, resulting in a liquid crystal Fresnel lens that introduces spherical optical power and has a tunable and controllable focal length. Application of additional independent voltages to the distributed electrodes 640 enables the index of refraction of the liquid crystal material 630 to be varied in the lateral direction (i.e., the x-y plane), enabling introduction of astigmatism and control of the rotation of the astigmatic axis. Thus, in applications, for example, in dual-mode reading glasses that can be operated in a focus-free mode and in a focus mode, the embodiment illustrated in FIG. 6 can provide electrically controllable optical power including astigmatism correction for the user.

Figure 7:
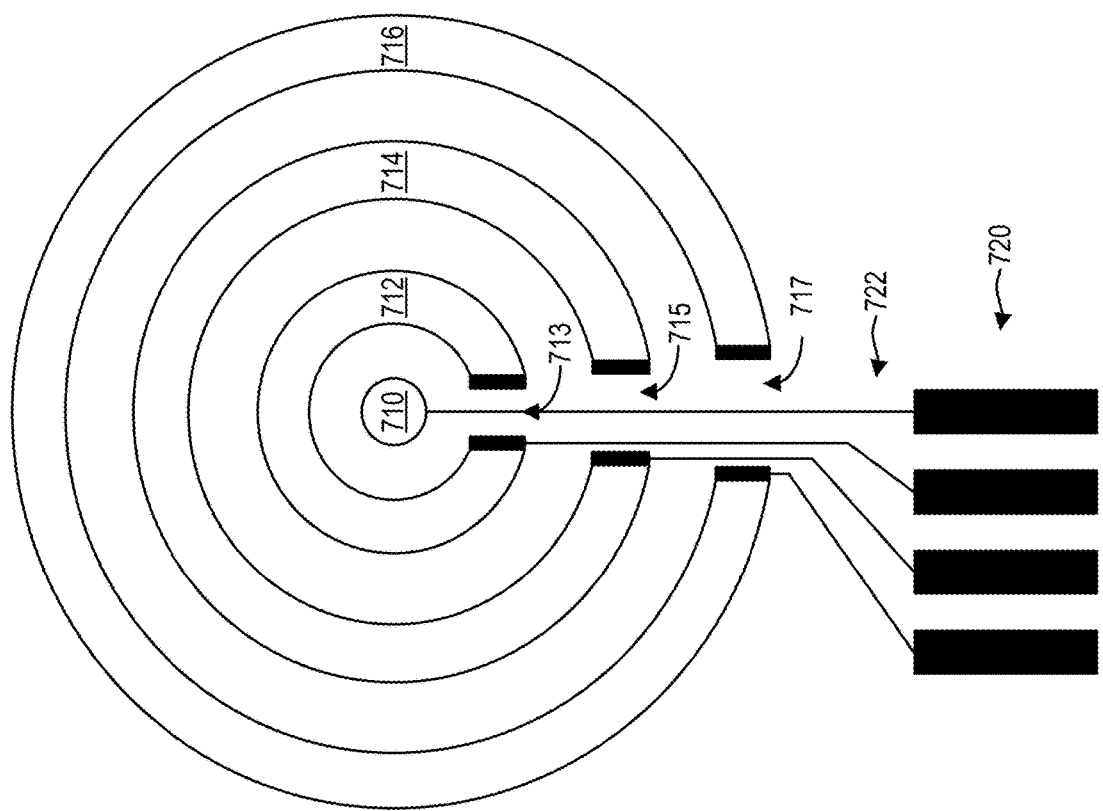
FIG. 7 illustrates a plan view of concentric electrodes for the astigmatic resistive bridge liquid crystal Fresnel lens illustrated in FIG. 6.

FIG. 7 illustrates a plan view of concentric electrodes for the astigmatic resistive bridge liquid crystal Fresnel lens illustrated in FIG. 6. A resistive bridge liquid crystal Fresnel lens utilizes a resistive bridge structure in place of the concentric electrode structure illustrated in FIG. 2B. Resistive bridge structures utilize an electrode layer that is patterned to define a plurality of electrodes in the shape of concentric rings surrounding a central electrode. The central electrode and the concentric ring electrodes are electrically separated from the central electrode or adjacent rings as appropriate by an electrically insulating space. The insulating space can be implemented as an open space disposed between adjacent electrodes or be filled with an electrically insulating material such as an oxide or a nitride depending on the particular application.

Referring to FIG. 7, concentric ring electrodes 712, 714, and 716 surround central electrode 710. For purposes of clarity, only three concentric ring electrodes are illustrated, but it will be appreciated that in general, the number of concentric ring electrodes will range from more than ten to several thousand, for example, 100, 250, or 500. Each of the electrodes, including the central electrode 710 and concentric ring electrodes 712, 714, and 716, can be connected to one of a set of independent drive contacts 720, each providing an independent voltage or voltage signal. Each drive contact is connected to a corresponding bus line 722. In other embodiments, multiple electrodes can be electrically connected to a common drive contact as appropriate to the particular application. The set of independent drive contacts 720 can be compared to multi-output driver 440 illustrated in FIG. 4A, which provides a set of independent voltages that can also be referred to as a set of independent voltage signals.

As illustrated in FIG. 7, the concentric ring electrodes 712, 714, and 716 are substantially annular and concentric in this embodiment, although other shapes are included within the scope of the present disclosure. As an example, other ring-like structures, including elliptical structures, could be utilized to modify the optical properties of the resistive bridge liquid crystal Fresnel lens, for example, to introduce astigmatism in addition to spherical optical power.

A resistive divider network is implemented in the embodiment illustrated in FIG. 7 by a resistive bridge with a predetermined resistance that electrically connects the electrodes. Depending on the application, the resistive bridge can have a resistance in the range of hundreds to thousands of ohms. As illustrated in FIG. 7, resistive bridge 713 is present in concentric ring electrode 712, resistive bridge 715 is present in concentric ring electrode 714, and resistive bridge 717 is present in concentric ring electrode 716. The geometry and materials forming the resistive bridge will depend on the particular application. Each resistive bridge results in a predetermined resistance between each adjacent electrode.

In order to implement spherical optical power using the resistive bridge liquid crystal Fresnel lens, the electrodes are part of a resistive divider network such that the voltage at each of the electrodes varies from the center to the periphery in a manner that the index of refraction of the liquid crystal material adjacent the electrodes increases or decreases as a function of radius. As a result, spherical optical power is provided by the radial index of refraction profile.

Figure 8:
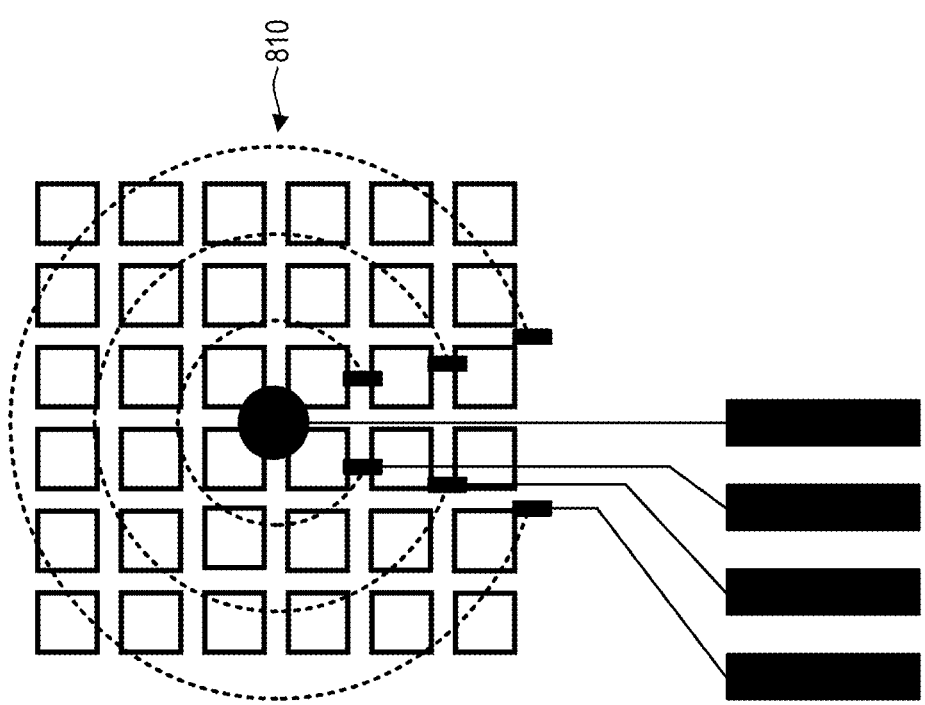
FIG. 8 illustrates a plan view of an astigmatic liquid crystal Fresnel lens including pixelated electrodes and resistive bridge electrodes according to an embodiment of the present disclosure.

FIG. 8 illustrates a plan view of an astigmatic liquid crystal Fresnel lens including pixelated electrodes and resistive bridge electrodes according to an embodiment of the present disclosure. Pixelated electrodes 810 (i.e., transparent conductive electrodes) are distributed in an array configuration, which is adjacent the liquid crystal material as illustrated in FIG. 6. The discussion provided in relation to FIG. 3A concerning pixelated electrodes is applicable to FIG. 8 as appropriate. Concentric electrodes are illustrated by dashed lines. In the embodiment illustrated in FIG. 8, the pixelated electrodes 810 are implemented as a two-dimensional array (i.e., a six-by-six array), but this is not required by the present disclosure. In other embodiments, a larger or smaller number of pixelated electrodes are utilized, including pixelated electrodes of differing dimensions. As an example, since, in a Fresnel lens, the Fresnel sections decrease in size with increasing radius, the pixelated electrodes in the central portion of the Fresnel lens could be larger in size compared to the pixelated electrodes in the peripheral portion of the Fresnel lens. Therefore, the pixelated electrodes 810 illustrated in FIG. 8 are merely exemplary and are not intended to limit the scope of the embodiments described in the present disclosure. Depending on the geometrical arrangement and the number of the pixelated electrodes 810, different techniques can be used to drive the pixelated electrodes 810, including direct drive, active matrix techniques including drive transistors, or the like. In order to fabricate pixelated electrodes 810, photolithography or other suitable printing techniques can be used to deposit an array of electrodes.

As discussed previously, the pixelated electrodes 810 can be independently controlled to provide predetermined voltages that are applied to the liquid crystal material 630. Based on these predetermined voltages, pixelated electrodes 810 can be utilized to form a Fresnel lens with controllable spherical optical power by varying the index of refraction of the liquid crystal material in a radial manner. Phase wrapping can be implemented at the intersection between adjacent pixelated electrodes to provide suitable optical power. Alternatively, the pixelated electrodes 810 can be independently controlled to establish an index of refraction profile in the liquid crystal material that will result in astigmatic optical power.

Thus, in operation, voltages can be applied to the concentric electrodes 710-716 illustrated in FIG. 7 to provide tunable and controllable spherical optical power and to the pixelated electrodes 810 to supplement the spherical optical power and/or introduce astigmatic optical power. Application of independent voltages to the concentric electrodes enables the index of refraction of the liquid crystal material to be varied in the radial direction, resulting in a liquid crystal Fresnel lens that introduces spherical optical power and has a tunable and controllable focal length. Application of additional independent voltages to the pixelated electrodes enables the index of refraction of the liquid crystal material to be varied in the lateral direction (i.e., the x-y plane), enabling introduction of astigmatism and control of the rotation of the astigmatic axis. Thus, in applications, for example, in dual-mode reading glasses that can be operated in a focus-free mode and in a focus mode, the embodiment illustrated in FIG. 6, utilizing the resistive bridge structures illustrated in FIG. 7 and the pixelated electrode structure illustrated in FIG. 8, can provide electrically controllable optical power including astigmatism correction for the user.

Depending on the specific spherical optical power and astigmatism utilized in a particular application, the combination of the spherical optical power resulting from application of predetermined voltages to the resistive bridge structure and additional spherical optical power and/or astigmatism resulting from application of predetermined voltages to the pixelated electrodes, a wide range of optical powers and astigmatism can be achieved. As with other embodiments, phase wrapping can be implemented at the intersection between adjacent concentric electrodes and/or pixelated electrodes to provide suitable optical power. One of ordinary skill in the art would recognize many variations, modifications, and alternatives.

Figure 9:
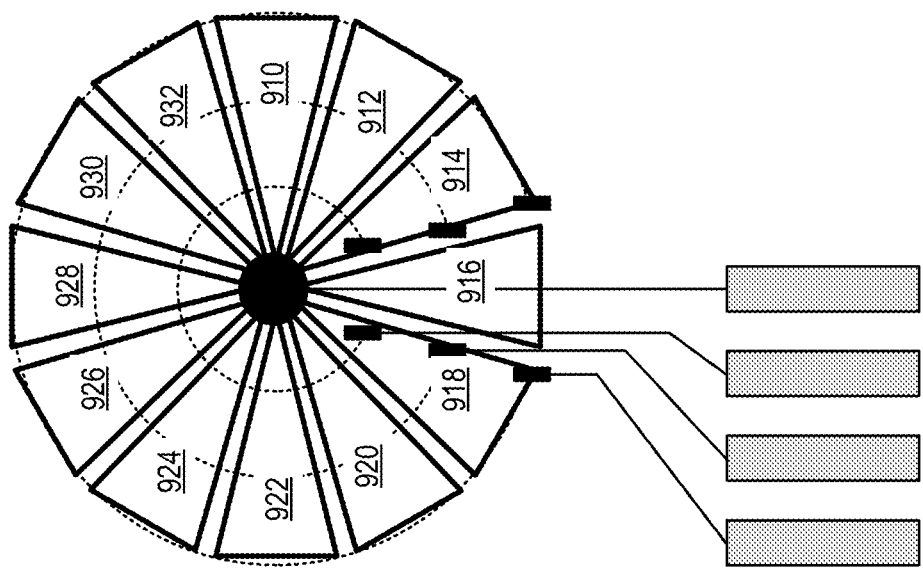
FIG. 9 illustrates a plan view of an astigmatic liquid crystal Fresnel lens including segmented electrodes and resistive bridge electrodes according to an embodiment of the present disclosure.

FIG. 9 illustrates a plan view of an astigmatic liquid crystal Fresnel lens including segmented electrodes and resistive bridge electrodes according to an embodiment of the present disclosure. In a manner similar to the implementation illustrated in FIG. 8, segmented electrodes 910, 912, 914, 916, 918, 920, 922, 924, 926, 928, 930, and 932 are distributed adjacent to each other and cover a range of angles. In other embodiments using a different number of segmented electrodes, the angular coverage of each segmented electrode will vary accordingly. The discussion provided in relation to FIG. 4A concerning segmented electrodes is applicable to FIG. 9 as appropriate.

In operation, voltages can be applied to the concentric electrodes 710-716 illustrated in FIG. 7 to provide tunable and controllable spherical optical power and to the segmented electrodes 910-932 to supplement the spherical optical power and introduce astigmatic optical power. Application of independent voltages to the concentric electrodes enables the index of refraction of the liquid crystal material to be varied in the radial direction, resulting in a liquid crystal Fresnel lens that introduces spherical optical power and has a tunable and controllable focal length. Application of additional independent voltages to the segmented electrodes enables the index of refraction of the liquid crystal material to be varied in the lateral direction (i.e., the x-y plane), enabling introduction of astigmatism and control of the rotation of the astigmatic axis. Thus, in applications, for example, in dual-mode reading glasses that can be operated in a focus-free mode and in a focus mode, the embodiment illustrated in FIG. 6, utilizing the resistive bridge structures illustrated in FIG. 7 and the segmented electrode structure illustrated in FIG. 9, can provide electrically controllable optical power including astigmatism correction for the user.

Depending on the specific spherical optical power and astigmatism utilized in a particular application, the combination of the spherical optical power resulting from application of predetermined voltages to the resistive bridge structure and additional spherical optical power and/or astigmatism resulting from application of predetermined voltages to the segmented electrodes, a wide range of optical powers and astigmatism can be achieved. As with other embodiments, phase wrapping can be implemented at the intersection between adjacent concentric electrodes and/or segmented electrodes to provide suitable optical power. One of ordinary skill in the art would recognize many variations, modifications, and alternatives.

Figure 10:
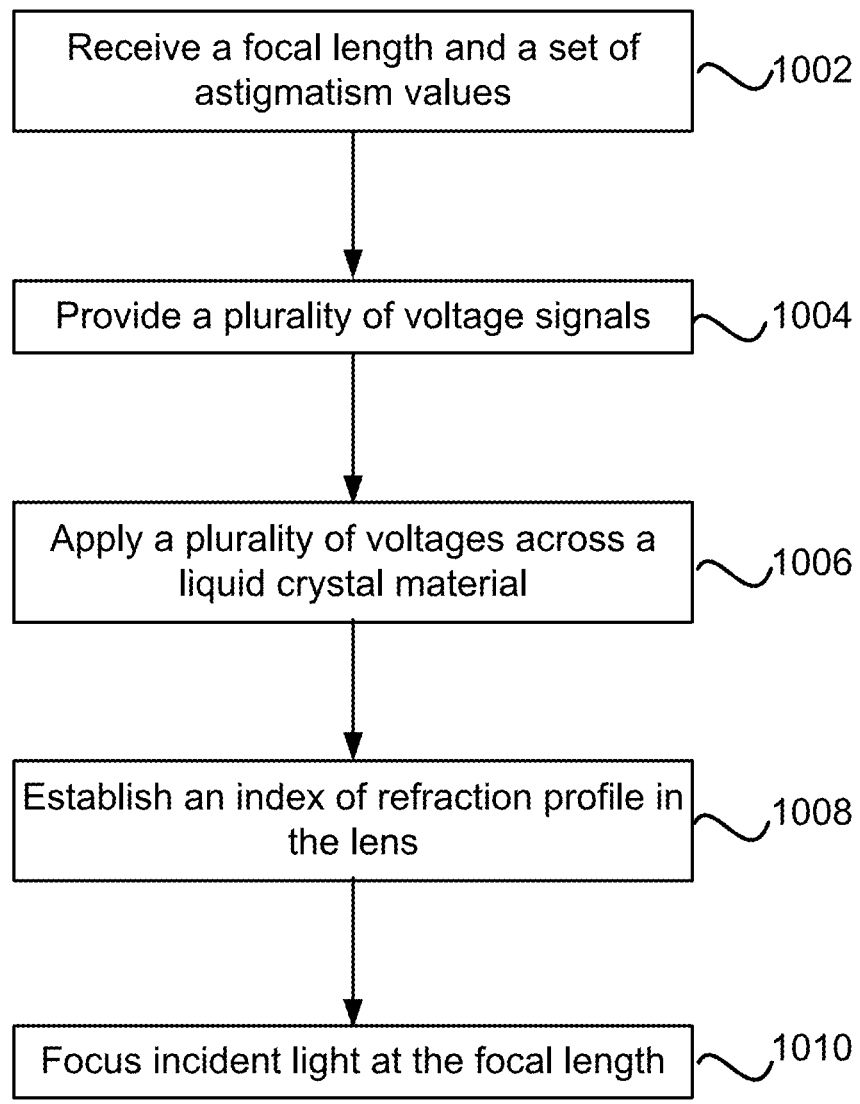
FIG. 10 illustrates an example of a flow for operating an astigmatic liquid crystal Fresnel lens according to an embodiment of the present disclosure.

FIG. 10 illustrates an example of a flow for operating an astigmatic liquid crystal Fresnel lens according to an embodiment of the present disclosure. The flow starts at operation 1002, where a focal length and a set of astigmatism values are received. Receiving the focal length and the set of astigmatism values can include receiving these values by accessing a memory coupled to controller 132, which can store programmed values specific to a particular user. The flow continues at operation 1004, where a plurality of voltage signals are provided. Each of the plurality of voltage signals is associated with one of a plurality of electrodes. The plurality of voltage signals can be provided using a multi-output driver that provides a set of independent voltage sources. The flow continues at operation 1006, where, using the plurality of electrodes, a plurality of voltages are applied across a liquid crystal material.

At operation 1008, an index of refraction profile is established in the lens in response to the plurality of voltages. The index of refraction profile corresponds to the focal length and the set of astigmatism values. At operation 1010, incident light is focused at the focal length.

In some embodiments, the focal length is adjustable and the method can include receiving a second focal length, applying, using the plurality of electrodes, a second plurality of voltages across the liquid crystal material, establishing a second index of refraction profile in the lens, and focusing incident light at the second focal length.

As discussed herein, embodiments of the present disclosure utilize Fresnel lens structures to introduce spherical optical power using a set of concentric electrodes and either augment the spherical optical power using a set of distributed electrodes and/or introduce astigmatic imaging using the set of distributed electrodes. Thus, the method can include establishing the index of refraction profile in a manner that varies as a function of lateral position, which is associated with spherical optical power. Additionally, the method can introduce astigmatism, with the set of astigmatism values including a first astigmatism value associated with a cylinder lens and an astigmatism axis along which the cylinder lens is oriented.

The type of distributed electrodes can be implemented depending on the particular application, with a set of pixelated electrodes arrayed in two dimensions that are used to apply the plurality of voltages across the liquid crystal material as illustrated in FIGS. 3A and 3C. Alternatively, the distributed electrodes can be implemented as a set of segmented electrodes arrayed in two dimensions as illustrated in FIGS. 4A and 9.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of operating an astigmatic liquid crystal Fresnel lens having a first set of electrodes and a second set of electrodes, the method comprising:
   receiving, at a controller, a focal length and a set of astigmatism values;
   providing a first plurality of voltage signals and a second plurality of voltage signals, wherein:
      each of the first plurality of voltage signals is associated with one or more electrodes of the first set of electrodes, wherein the first set of electrodes is disposed on a first side of a liquid crystal material and includes a center electrode and a set of annular electrodes, and;
      each of a first subset of the second plurality of voltage signals is associated with a single electrode of the second set of electrodes and each of a second subset of the second plurality of voltage signals is associated with multiple electrodes of the second set of electrodes, wherein the second set of electrodes is disposed on a second side of the liquid crystal material opposing the first side and arranged in a two-dimensional pattern and in electrical communication with the liquid crystal material;
   applying, using the first set of electrodes and the second set of electrodes, the first plurality of voltage signals and the second plurality of voltage signals to a liquid crystal material of the astigmatic liquid crystal Fresnel lens;
   establishing, in response to the first plurality of voltage signals and the second plurality of voltage signals, an index of refraction profile in the liquid crystal material, the index of refraction profile corresponding to the focal length and the set of astigmatism values; and
   focusing incident light at the focal length.

2. The method of claim 1 wherein receiving the focal length and the set of astigmatism values comprises accessing a memory coupled to the controller.

3. The method of claim 1 wherein the set of astigmatism values including a first astigmatism value associated with a cylinder lens and an astigmatism axis along which the cylinder lens is oriented.

4. The method of claim 1 wherein the focal length and the set of astigmatism values are specific to a particular user.

5. The method of claim 1 wherein providing the first plurality of voltage signals and the second plurality of voltage signals comprises use of a multi-output driver operable to provide the first plurality of voltage signals and the second plurality of voltage signals.

6. The method of claim 1 further comprising:
   receiving a second focal length;
   applying, using the first set of electrodes and the second set of electrodes, a third plurality of voltage signals and a fourth plurality of voltage signals to the liquid crystal material;
   establishing, in response to the third plurality of voltage signals and the fourth plurality of voltage signals, a second index of refraction profile in the liquid crystal material, the second index of refraction profile corresponding to the second focal length and the set of astigmatism values; and
   focusing incident light at the second focal length.

7. The method of claim 1 wherein the two-dimensional pattern comprises a two-dimensional array of pixelated electrodes.

8. The method of claim 7 wherein:
   the multiple electrodes of the second set of electrodes include central electrodes of the two-dimensional array of pixelated electrodes; and
   the central electrodes are positioned opposite the center electrode of the first set of electrodes.

9. The method of claim 7 wherein the multiple electrodes of the second set of electrodes are positioned at a same radial distance from the center electrode of the first set of electrodes.

10. The method of claim 7 wherein dimensions of the pixelated electrodes of the two-dimensional array of pixelated electrodes decrease in size with increasing radial distance from the center electrode of the first set of electrodes.

11. A system comprising:
   one or more processors; and
   one or more memory storing computer-readable instructions that, upon execution by the one or more processors, configure the system to:
      receive, at a controller, a focal length and a set of astigmatism values;
      provide a first plurality of voltage signals and a second plurality of voltage signals, wherein each of the first plurality of voltage signals is associated with one or more electrodes of a first set of electrodes, wherein the first set of electrodes is disposed on a first side of a liquid crystal material and includes a center electrode and a set of annular electrodes, and each of a first subset of the second plurality of voltage signals is associated with a single electrode of a second set of electrodes and each of a second subset of the second plurality of voltage signals is associated with multiple electrodes of the second set of electrodes, wherein the second set of electrodes is disposed on a second side of the liquid crystal material opposing the first side and arranged in a two-dimensional pattern and in electrical communication with the liquid crystal material;

apply, using the first set of electrodes and the second set of electrodes, the first plurality of voltage signals and the second plurality of voltage signals to the liquid crystal material;

establish, in response to the first plurality of voltage signals and the second plurality of voltage signals, an index of refraction profile in the liquid crystal material, the index of refraction profile corresponding to the focal length and the set of astigmatism values; and focus incident light at the focal length.

12. The system of claim 11 wherein the focal length and the set of astigmatism values are stored in the one or more memory.

13. The system of claim 11 wherein the set of astigmatism values including a first astigmatism value associated with a cylinder lens and an astigmatism axis along which the cylinder lens is oriented.

14. The system of claim 11 wherein the focal length and the set of astigmatism values are specific to a particular user.

15. The system of claim 11 further comprising a multi-output driver, wherein providing the first plurality of voltage signals and the second plurality of voltage signals comprises use of a multi-output driver operable to provide the first plurality of voltage signals and the second plurality of voltage signals.

16. The system of claim 11 further comprising computer-readable instructions that, upon execution by the one or more processors, further configure the system to:

receive a second focal length;

apply, using the first set of electrodes and the second set of electrodes, a third plurality of voltage signals and a fourth plurality of voltage signals to the liquid crystal material;

establish, in response to the third plurality of voltage signals and the fourth plurality of voltage signals, a second index of refraction profile in the liquid crystal material, the second index of refraction profile corresponding to the second focal length and the set of astigmatism values; and focus incident light at the second focal length.

17. The system of claim 11 wherein the two-dimensional pattern comprises a two-dimensional array of pixelated electrodes.

18. The system of claim 17 wherein:

the multiple electrodes of the second set of electrodes include central electrodes of the two-dimensional array of pixelated electrodes; and the central electrodes are positioned opposite the center electrode of the first set of electrodes.

19. The system of claim 17 wherein the multiple electrodes of the second set of electrodes are positioned at a same radial distance from the center electrode of the first set of electrodes.

20. The system of claim 17 wherein dimensions of the pixelated electrodes of the two-dimensional array of pixelated electrodes decrease in size with increasing radial distance from the center electrode of the first set of electrodes.

* * * * *